US011661504B2

(12) United States Patent
Alvarez

(10) Patent No.: US 11,661,504 B2
(45) Date of Patent: May 30, 2023

(54) THERMOPLASTIC COMPOSITION

(71) Applicant: Milliken & Company, Spartanburg, SC (US)

(72) Inventor: Francisco Alvarez, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 452 days.

(21) Appl. No.: 16/717,648

(22) Filed: Dec. 17, 2019

(65) Prior Publication Data

US 2020/0231793 A1     Jul. 23, 2020

Related U.S. Application Data

(60) Provisional application No. 62/795,818, filed on Jan. 23, 2019.

(51) Int. Cl.

| | |
|---|---|
| *C08L 23/12* | (2006.01) |
| *C08L 23/14* | (2006.01) |
| *C08L 23/06* | (2006.01) |
| *C08L 71/02* | (2006.01) |
| *C08L 71/08* | (2006.01) |
| *C08J 3/22* | (2006.01) |
| *C08J 3/12* | (2006.01) |
| *C08K 5/00* | (2006.01) |
| *C08K 5/521* | (2006.01) |
| *C08K 5/098* | (2006.01) |

(52) U.S. Cl.
CPC ............ *C08L 23/12* (2013.01); *C08J 3/12* (2013.01); *C08J 3/22* (2013.01); *C08K 5/0083* (2013.01); *C08K 5/098* (2013.01); *C08K 5/521* (2013.01); *C08L 23/06* (2013.01); *C08L 23/14* (2013.01); *C08L 71/02* (2013.01); *C08L 71/08* (2013.01); *C08L 2203/30* (2013.01); *C08L 2207/04* (2013.01); *C08L 2207/066* (2013.01); *C08L 2310/00* (2013.01)

(58) Field of Classification Search
CPC ......... C08L 23/12; C08L 23/14; C08L 23/06; C08L 2207/04; C08L 2203/30; C08L 2207/066; C08L 2310/00; C08L 71/02; C08K 5/0083; C08K 5/521; C08K 5/098; C08J 3/22; C08J 3/12
See application file for complete search history.

(56) References Cited

U.S. PATENT DOCUMENTS

| | | | |
|---|---|---|---|
| 4,463,113 A | 7/1984 | Nakahara et al. | 524/117 |
| 5,342,868 A | 8/1994 | Kimura et al. | 524/108 |
| 6,585,819 B2 | 7/2003 | Zhao | 106/162.1 |
| 6,911,517 B2 | 6/2005 | Dotson | 526/351 |
| 7,781,511 B2 | 8/2010 | Li et al. | 524/493 |
| 8,022,133 B2 | 9/2011 | Xu et al. | 524/528 |
| 8,436,089 B2 | 5/2013 | Finlayson et al. | 524/425 |
| 8,835,542 B2 | 9/2014 | Connor et al. | 524/132 |
| 9,139,709 B2 | 9/2015 | Jamtvedt et al. | |
| 9,193,845 B2 | 11/2015 | Qin et al. | |
| 9,200,144 B2 | 12/2015 | Miley et al. | |
| 9,376,558 B2 | 6/2016 | Price et al. | |
| 9,580,575 B2 | 2/2017 | Dotson et al. | |
| 9,994,695 B2 | 6/2018 | Lake, Jr. et al. | |
| 10,131,751 B2 | 11/2018 | Lake, Jr. et al. | |
| 10,414,898 B2 | 9/2019 | Canada et al. | |
| 2009/0029182 A1 | 1/2009 | Aubee et al. | |
| 2011/0143155 A1 | 6/2011 | Aubee et al. | |
| 2015/0132593 A1 | 5/2015 | Borse et al. | |
| 2017/0130040 A1 | 5/2017 | Aubee et al. | |

FOREIGN PATENT DOCUMENTS

| | | | |
|---|---|---|---|
| EP | 3 339 376 | 6/2018 | |
| WO | WO 2007/033297 | 3/2007 | |
| WO | WO-2007033297 A1 * | 3/2007 | ........... C08K 5/0083 |

OTHER PUBLICATIONS

Patent Cooperation Treaty PCT International Search Report, dated Apr. 23, 2020. International Application No. PCT/US2019/067801. International Filing Date: Dec. 20, 2019.

* cited by examiner

*Primary Examiner* — Robert D Harlan
(74) *Attorney, Agent, or Firm* — Cheryl J. Brickey

(57) ABSTRACT

An extrusion composition containing at least one resin selected from the group consisting of polypropylene homopolymers, polypropylene random copolymers, and polypropylene impact copolymers. The extrusion composition also contains at least one benzoic acid salt-based nucleating agent provided in the composition at a use level of between about 0.01 and 0.15 parts by weight, in relation to 100 parts by weight of the resin and at least one co-additive selected from the group consisting of poly(ethylene glycol) and copolymers containing segments of ethylene oxide, wherein the co-additive has a number average molecular weight of about 300 or more, and wherein the use level of the co-additive is about 0.005 parts by weight or more, in relation to 100 parts by weight of the resin.

5 Claims, No Drawings

THERMOPLASTIC COMPOSITION

RELATED APPLICATIONS

This application claims priority to U.S. Provisional Patent Application 62/795,818, filed on Jan. 23, 2019.

TECHNICAL FIELD

The present invention relates generally to nucleated polyolefin compositions having improved mechanical properties.

BACKGROUND

Numerous nucleating and clarifying agents are used as plastic additives. Several nucleating agents for thermoplastic polymers are known in the art. These nucleating agents generally function by forming nuclei or providing sites for the formation and/or growth of crystals in the thermoplastic polymer as it solidifies from a molten state. The nuclei or sites provided by the nucleating agent allow the crystals to form within the cooling polymer at a higher temperature and/or at a more rapid rate than the crystals will form in the virgin, non-nucleated thermoplastic polymer. These effects can then permit processing of a nucleated thermoplastic polymer composition at cycle times that are shorter than the virgin, non-nucleated thermoplastic polymer. Such compounds assist in optically clarifying plastics or otherwise improving the processing or physical characteristics of polymers in plastic products. Many plastic products sold and used are made from polymer materials that contain nucleating or clarifying agents within the polymer.

While polymer nucleating agents may function in a similar manner, not all nucleating agents are created equal. For example, a particular nucleating agent may be very effective at increasing the peak polymer recrystallization temperature of a thermoplastic polymer, but such a nucleating agent may cause different shrinkage of a molded part produced from a thermoplastic polymer composition (compared to a non-nucleated version). Such a nucleating agent may also be ineffective in increasing the stiffness of the molded part to a desirable degree. Different nucleating agents impart different levels of optical properties improvements to the thermoplastic polymer compositions.

Given the complicated interrelationship of these properties and the fact that many nucleating agents exhibit less-than-optimal behavior in at least one respect, it would be desirable to have a nucleated polyolefin that also had good thermal and optical properties with increased mechanical properties such as stiffness.

BRIEF SUMMARY

An extrusion composition contains at least one resin selected from the group consisting of polypropylene homopolymers, polypropylene random copolymers, and polypropylene impact copolymers. The extrusion composition also contains at least one phosphate ester-based nucleating agent provided in the composition at a use level of between about 0.01 and 0.15 parts by weight, in relation to 100 parts by weight of the resin and at least one co-additive selected from the group consisting of poly(ethylene glycol) and copolymers containing segments of ethylene oxide, wherein the co-additive has a number average molecular weight of about 300 or more, and wherein the use level of the co-additive is about 0.005 parts by weight or more, in relation to 100 parts by weight of the resin.

A masterbatch composition contains at least one resin selected from the group consisting of polypropylene homopolymers, polypropylene random copolymers, and polypropylene impact copolymers. The masterbatch composition also contains at least one phosphate ester-based nucleating agent provided in the composition at a use level of between about 1 and 30 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.5 parts by weight or more, in relation to 100 parts by weight of the resin.

An extrusion composition contains at least one resin selected from the group consisting of polypropylene homopolymers, polypropylene random copolymers, and polypropylene impact copolymers. The extrusion composition also contains at least one benzoic acid salt-based nucleating agent provided in the composition at a use level of between about 0.01 and 0.15 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.005 parts by weight or more, in relation to 100 parts by weight of the resin.

A masterbatch composition contains at least one resin selected from the group consisting of polypropylene homopolymers, polypropylene random copolymers, and polypropylene impact copolymers. The mast batch composition also contains at least one phosphate ester-based nucleating agent provided in the composition at a use level of between about 1 and 30 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.5 parts by weight or more, in relation to 100 parts by weight of the resin.

An extrusion composition contains at least one resin selected from the group consisting of polypropylene homopolymers, polypropylene random copolymers, and polypropylene impact copolymers. The extrusion composition also contains at least one phosphate ester-based nucleating agent provided in the composition at a use level of between about 0.01 and 0.15 parts by weight, in relation to 100 parts by weight of the resin and at least one co-additive selected from the group consisting of poly(ethylene glycol) and copolymers containing segments of ethylene oxide, wherein the co-additive has a number average molecular weight of about 300 or more, and wherein the use level of the co-additive is about 0.005 parts by weight or more, in relation to 100 parts by weight of the resin.

A masterbatch composition contains at least one resin selected from the group consisting of high density polyethylene, linear low density polyethylene, and low density polyethylene. The masterbatch composition also contains at least one phosphate ester-based nucleating agent provided in the composition at a use level of between about 1 and 30 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.5 parts by weight or more, in relation to 100 parts by weight of the resin.

An extrusion composition contains at least one resin selected from the group consisting of high density polyethylene, linear low density polyethylene, and low density polyethylene. The extrusion composition also contains at least one benzoic acid salt-based nucleating agent provided in the composition at a use level of between about 0.01 and 0.15 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.005 parts by weight or more, in relation to 100 parts by weight of the resin.

A masterbatch composition contains at least one resin selected from the group consisting of high density polyethylene, linear low density polyethylene, and low density polyethylene. The mast batch composition also contains at least one benzoic acid salt-based nucleating agent provided in the composition at a use level of between about 1 and 30 parts by weight, in relation to 100 parts by weight of the resin and at least one co-additive selected from the group consisting of poly(ethylene glycol), and copolymers containing segments of ethylene oxide, wherein the co-additive has a number average molecular weight of about 300 or more, and wherein the use level of the co-additive is about 0.5 parts by weight or more, in relation to 100 parts by weight of the resin.

DETAILED DESCRIPTION

Many types of additives are used in thermoplastic polyolefin compositions for different optical and physical properties. The polymer compositions described above can contain other polymer additives in addition to those contained in the additive composition. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., hydrotalcite-like acid scavengers [e.g., DHT-4A® from Kisuma Chemicals], metal salts of fatty acids [e.g., the metal salts of stearic acid], and metals salts of fatty acid esters [e.g., lactylate salts]), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, sorbitan and combinations thereof), and combinations of the foregoing.

When the term "extrusion composition" is used in the application, this is referring to the polyolefin composition that is used to make finished goods. The composition is extruded (or blown, etc) into food storage contains, toys, and other goods. When the term "masterbatch composition" is used in the application, this is referring to a polyolefin composition that contains much higher concentrations of additives than typical finished goods. This masterbatch is then mixed with polymer with little to no additives to dilute the additives to the desired amount for a finished good. It is typically easier and less expensive to use a masterbatch composition to introduce low levels of additives than it would be to add them directly to the extrusion composition. As masterbatches are already premixed compositions, their use alleviates issues with the additive clumping or insufficient dispersion. The concentration of the additive in the masterbatch is much higher than in the end-use polymer, but the additive is already properly dispersed in the host resin. The masterbatches can be fairly highly concentrated (in comparison with the target composition), with high "let-down ratios"; e.g. one 25 kg bag can be used for a ton of natural polymer. The relatively dilute nature of masterbatches (in comparison with the raw additives) allows higher accuracy in dosing small amounts of expensive components.

As used herein, the term "thermoplastic" refers generally to a polymeric or polymer material that will melt upon exposure to sufficient heat but will regain its solidified state upon cooling. Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Preferably, the polymer is a thermoplastic polymer. More preferably, the thermoplastic polymer is a polyolefin. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylenepropylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

In one embodiment, the thermoplastic polymer contains polypropylene homopolymers, polypropylene random copolymers, polypropylene impact copolymers and mixtures thereof. As noted above, the additive compositions of the invention are particularly useful in the nucleation of polyolefins, such as polypropylene polymers. Thus, in another series of embodiments, the invention provides a polymer composition comprising a polymer and an additive composition as described herein. The polymer composition can comprise any suitable polymer.

In another preferred embodiment, the thermoplastic polymer can be a polyethylene. Suitable polyethylenes include, but are not limited to, low density polyethylene, linear low density polyethylene, medium density polyethylene, high density polyethylene, and combinations thereof. In certain preferred embodiments, the thermoplastic polymer is selected from the group consisting of linear low density polyethylene, high density polyethylene, and mixtures thereof. In another preferred embodiment, the thermoplastic polymer is a high density polyethylene.

The high density polyethylene polymers suitable for use in the invention generally have a density of greater than about 0.940 g/cm$^3$. There is no upper limit to the suitable density of the polymer, but high density polyethylene polymers typically have a density that is less than about 0.980 g/cm$^3$ (e.g., less than about 0.975 g/cm$^3$).

The high density polyethylene polymers suitable for use in the invention can be either homopolymers or copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 5% by weight or less (e.g., about 3 mol. % or less). As will be understood by those of ordinary skill in the art, the amount of comonomer suitable for the copolymer is largely driven by the end use for the copolymer and the required or desired polymer properties dictated by that end use.

The high density polyethylene polymers suitable for use in the invention can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which utilize a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The high density polyethylene polymers suitable for use in the invention can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis (cyclopentadienyl) $Cr^{2+}$, onto a chromium oxide catalyst, such as those described above. Suitable transition metal catalysts also include supported chromium catalysts such as those based on chromocene or a silylchromate (e.g., bi(tris-phenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as —$CH_2CH_2$— or >$SiPh_2$. The metallocene catalysts typically are used in conjunction with a cocatalyst, such as methyl aluminoxane (i.e., $(Al(CH_3)_xO_y)_n$. Other cocatalysts include those described in U.S. Pat. No. 5,919,983 (Rosen et al.), U.S. Pat.

No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing high density polyethylene include diimine complexes, such as those described in U.S. Pat. No. 5,891,963 (Brookhart et al.).

The high density polyethylene polymers suitable for use in the invention can have any suitable molecular weight (e.g., weight average molecular weight). For example, the weight average molecular weight of the high density polyethylene can be from 20,000 g/mol to about 1,000,000 g/mol or more. As will be understood by those of ordinary skill in the art, the suitable weight average molecular weight of the high density polyethylene will depend, at least in part, on the particular application or end use for which the polymer is destined. For example, a high density polyethylene polymer intended for blow molding applications can have a weight average molecular weight of about 100,000 g/mol to about 1,000,000 g/mol. A high density polyethylene polymer intended for pipe applications or film applications can have a weight average molecular weight of about 100,000 g/mol to about 500,000 g/mol. A high density polyethylene polymer intended for injection molding applications can have a weight average molecular weight of about 20,000 g/mol to about 80,000 g/mol. A high density polyethylene polymer intended for wire insulation applications, cable insulation applications, tape applications, or filament applications can have a weight average molecular weight of about 80,000 g/mol to about 400,000 g/mol. A high density polyethylene polymer intended for rotomolding applications can have a weight average molecular weight of about 50,000 g/mol to about 150,000 g/mol.

The high density polyethylene polymers suitable for use in the invention can also have any suitable polydispersity, which is defined as the value obtained by dividing the weight average molecular weight of the polymer by the number average molecular weight of the polymer. For example, the high density polyethylene polymer can have a polydispersity of greater than 2 to about 100. As understood by those skilled in the art, the polydispersity of the polymer is heavily influenced by the catalyst system used to produce the polymer, with the metallocene and other "single site" catalysts generally producing polymers with relatively low polydispersity and narrow molecular weight distributions and the other transition metal catalysts (e.g., chromium catalysts) producing polymer with higher polydispersity and broader molecular weight distributions. The high density polyethylene polymers suitable for use in the invention can also have a multimodal (e.g., bimodal) molecular weight distribution. For example, the polymer can have a first fraction having a relatively low molecular weight and a second fraction having a relatively high molecular weight. The difference between the weight average molecular weight of the fractions in the polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight.

The high density polyethylene polymers suitable for use in the invention can have any suitable melt index. For example, the high density polyethylene polymer can have a melt index of about 0.01 dg/min to about 80 dg/min. As with the weight average molecular weight, those of ordinary skill in the art understand that the suitable melt index for the high density polyethylene polymer will depend, at least in part, on the particular application or end use for which the polymer is destined. Thus, for example, a high density polyethylene polymer intended for blow molding applications can have a melt index of about 0.01 dg/min to about 1 dg/min. A high density polyethylene polymer intended for blown film applications can have a melt index of about 0.5 dg/min to about 3 dg/min. A high density polyethylene polymer intended for cast film applications can have a melt index of about 2 dg/min to about 10 dg/min. A high density polyethylene polymer intended for pipe applications can have a melt index of about 0.02 dg/min to about 0.8 dg/min. A high density polyethylene polymer intended for injection molding applications can have a melt index of about 2 dg/min to about 80 dg/min. A high density polyethylene polymer intended for rotomolding applications can have a melt index of about 0.5 dg/min to about 10 dg/min. A high density polyethylene polymer intended for tape applications can have a melt index of about 0.2 dg/min to about 4 dg/min. A high density polyethylene polymer intended for filament applications can have a melt index of about 1 dg/min to about 20 dg/min. The melt index of the polymer is measured using ASTM Standard D1238-04c.

The high density polyethylene polymers suitable for use in the invention generally do not contain high amounts of long-chain branching. The term "long-chain branching" is used to refer to branches that are attached to the polymer chain and are of sufficient length to affect the rheology of the polymer (e.g., branches of about 130 carbons or more in length). If desired for the application in which the polymer is to be used, the high density polyethylene polymer can contain small amounts of long-chain branching. However, the high density polyethylene polymers suitable for use in the invention typically contain very little long-chain branching (e.g., less than about 1 long-chain branch per 10,000 carbons, less than about 0.5 long-chain branches per 10,000 carbons, less than about 0.1 long-chain branches per 10,000 carbons, or less than about 0.01 long-chain branches per 10,000 carbons).

The medium density polyethylene polymers suitable for use in the invention generally have a density of about 0.926 g/cm$^3$ to about 0.940 g/cm$^3$. The term "medium density polyethylene" is used to refer to polymers of ethylene that have a density between that of high density polyethylene and linear low density polyethylene and contain relatively short branches, at least as compared to the long branches present in low density polyethylene polymers produced by the free radical polymerization of ethylene at high pressures.

The medium density polyethylene polymers suitable for use in the invention generally are copolymers of ethylene and at least one α-olefin, such as 1 butene, 1-hexene, 1-octene, 1-decene, and 4-methyl-1-pentene. The α-olefin comonomer can be present in any suitable amount, but typically is present in an amount of less than about 8% by weight (e.g., less than about 5 mol %). As will be understood by those of ordinary skill in the art, the amount of comonomer suitable for the copolymer is largely driven by the end use for the copolymer and the required or desired polymer properties dictated by that end use.

The medium density polyethylene polymers suitable for use in the invention can be produced by any suitable process. Like the high density polyethylene polymers, the medium density polyethylene polymers typically are produced in "low pressure" catalytic processes such as any of the processes described above in connection with the high density polyethylene polymers suitable for use in the invention. Examples of suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The medium density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The medium density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The medium density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The medium density polyethylene polymers suitable for use in the invention can also be produced using supported chromium catalysts such as those described above in the discussion of catalysts suitable for making high density polyethylene. The medium density polyethylene polymers suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4{-}$ or $B(C_6F_5)_3CH_3{-}$. A fourth class of metallocene catalysts that can be used are metallocene-based complexes of a transition metal, such as titanium, containing one cyclopentadienyl ligand in combination with another ligand, such as a phosphinimine or $-O-SiR_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The medium density polyethylene polymers suitable for use in the invention can have any suitable compositional uniformity, which is a term used to describe the uniformity of the branching in the copolymer molecules of the polymer. Many commercially-available medium density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of medium density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The medium density polyethylene polymers suitable for use in the invention can have any suitable molecular weight. For example, the polymer can have a weight average molecular weight of about 50,000 g/mol to about 200,000 g/mol. As will be understood by those of ordinary skill in the art, the suitable weight average molecular weight of the medium density polyethylene will depend, at least in part, on the particular application or end use for which the polymer is destined.

The medium density polyethylene polymers suitable for use in the invention can also have any suitable polydispersity. Many commercially available medium density polyethylene polymers have a polydispersity of about 2 to about 30. The medium density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal medium density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The medium density polyethylene polymers suitable for use in the invention can have any suitable melt index. For example, the medium density polyethylene polymer can have a melt index of about 0.01 dg/min to about 200 dg/min. As with the weight average molecular weight, those of ordinary skill in the art understand that the suitable melt index for the medium density polyethylene polymer will depend, at least in part, on the particular application or end use for which the polymer is destined. Thus, for example, a medium density polyethylene polymer intended for blow molding applications or pipe applications can have a melt index of about 0.01 dg/min to about 1 dg/min. A medium density polyethylene polymer intended for blown film applications can have a melt index of about 0.5 dg/min to about 3 dg/min. A medium density polyethylene polymer intended for cast film applications can have a melt index of about 2 dg/min to about 10 dg/min. A medium density polyethylene polymer intended for injection molding applications can have a melt index of about 6 dg/min to about 200 dg/min. A medium density polyethylene polymer intended for roto-molding applications can have a melt index of about 4 dg/min to about 7 dg/min. A medium density polyethylene polymer intended for wire and cable insulation applications can have a melt index of about 0.5 dg/min to about 3 dg/min. The melt index of the polymer is measured using ASTM Standard D1238-04c.

The medium density polyethylene polymers suitable for use in the invention generally do not contain a significant amount of long-chain branching. For example, the medium density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The linear low density polyethylene polymers suitable for use in the invention generally have a density of 0.925 g/cm$^3$ or less (e.g., about 0.910 g/cm$^3$ to about 0.925 g/cm$^3$). The term "linear low density polyethylene" is used to refer to lower density polymers of ethylene having relatively short branches, at least as compared to the long branches present in low density polyethylene polymers produced by the free radical polymerization of ethylene at high pressures.

The linear low density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 6 mol. % (e.g., about 2 mol % to about 5 mol %). As will be understood by those of ordinary skill in the art, the amount of comonomer suitable for the copolymer is largely driven by the end use for the copolymer and the required or desired polymer properties dictated by that end use.

The linear low density polyethylene polymers suitable for use in the invention can be produced by any suitable process. Like the high density polyethylene polymers, the linear low density polyethylene polymers typically are produced in "low pressure" catalytic processes such as any of the processes described above in connection with the high density polyethylene polymers suitable for use in the invention. Suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The linear low density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The linear low density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The linear low density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The linear low density polyethylene polymers suitable for use in the invention can also be produced using supported chromium catalysts such as those described above in the discussion of catalysts suitable for making high density polyethylene. The linear low density polyethylene suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—SiR$_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The linear low density polyethylene polymers suitable for use in the invention can have any suitable compositional uniformity, which is a term used to describe the uniformity of the branching in the copolymer molecules of the polymer. Many commercially-available linear low density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of linear low density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The linear low density polyethylene polymers suitable for use in the invention can have any suitable molecular weight. For example, the polymer can have a weight average molecular weight of about 20,000 g/mol to about 250,000 g/mol. As will be understood by those of ordinary skill in the art, the suitable weight average molecular weight of the linear low density polyethylene will depend, at least in part, on the particular application or end use for which the polymer is destined.

The linear low density polyethylene polymers suitable for use in the invention can also have any suitable polydispersity. Many commercially available linear low density polyethylene polymers have a relatively narrow molecular weight distribution and thus a relatively low polydispersity, such as about 2 to about 5 (e.g., about 2.5 to about 4.5 or about 3.5 to about 4.5). The linear low density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal linear low density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The linear low density polyethylene polymers suitable for use in the invention can have any suitable melt index. For example, the linear low density polyethylene polymer can have a melt index of about 0.01 dg/min to about 200 dg/min. As with the weight average molecular weight, those of ordinary skill in the art understand that the suitable melt index for the linear low density polyethylene polymer will depend, at least in part, on the particular application or end use for which the polymer is destined. Thus, for example, a linear low density polyethylene polymer intended for blow molding applications or pipe applications can have a melt index of about 0.01 dg/min to about 1 dg/min. A linear low density polyethylene polymer intended for blown film applications can have a melt index of about 0.5 dg/min to about 3 dg/min. A linear low density polyethylene polymer intended for cast film applications can have a melt index of about 2 dg/min to about 10 dg/min. A linear low density polyethylene polymer intended for injection molding applications can have a melt index of about 6 dg/min to about 200 dg/min. A linear low density polyethylene polymer intended for rotomolding applications can have a melt index of about 4 dg/min to about 7 dg/min. A linear low density polyethylene polymer intended for wire and cable insulation applications can have a melt index of about 0.5 dg/min to about 3 dg/min. The melt index of the polymer is measured using ASTM Standard D1238-04c.

The linear low density polyethylene polymers suitable for use in the invention generally do not contain a significant amount of long-chain branching. For example, the linear low density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The low density polyethylene polymers suitable for use in the invention generally have a density of less than 0.935 g/cm$^3$ and, in contrast to high density polyethylene, medium density polyethylene and linear low density polyethylene, have a relatively large amount of long-chain branching in the polymer.

The low density polyethylene polymers suitable for use in the invention can be either ethylene homopolymers or copolymers of ethylene and a polar comonomer. Suitable polar comonomers include, but are not limited to, vinyl acetate, methyl acrylate, ethyl acrylate, and acrylic acid. These comonomers can be present in any suitable amount, with comonomer contents as high as 20% by weight being used for certain applications. As will be understood by those skilled in the art, the amount of comonomer suitable for the polymer is largely driven by the end use for the polymer and the required or desired polymer properties dictated by that end use.

The low density polyethylene polymers suitable for use in the invention can be produced using any suitable process, but typically the polymers are produced by the free-radical initiated polymerization of ethylene at high pressure (e.g., about 81 to about 276 MPa) and high temperature (e.g., about 130 to about 330° C.). Any suitable free radical initiator can be used in such processes, with peroxides and oxygen being the most common. The free-radical polymerization mechanism gives rise to short-chain branching in the polymer and also to the relatively high degree of long-chain branching that distinguishes low density polyethylene from other ethylene polymers (e.g., high density polyethylene and linear low density polyethylene). The polymerization reaction typically is performed in an autoclave reactor (e.g., a stirred autoclave reactor), a tubular reactor, or a combination of such reactors positioned in series.

The low density polyethylene polymers suitable for use in the invention can have any suitable molecular weight. For example, the polymer can have a weight average molecular weight of about 30,000 g/mol to about 500,000 g/mol. As will be understood by those of ordinary skill in the art, the suitable weight average molecular weight of the low density polyethylene will depend, at least in part, on the particular application or end use for which the polymer is destined. For example, a low density polyethylene polymer intended for blow molding applications can have a weight average molecular weight of about 80,000 g/mol to about 200,000 g/mol. A low density polyethylene polymer intended for pipe applications can have a weight average molecular weight of about 80,000 g/mol to about 200,000 g/mol. A low density polyethylene polymer intended for injection molding applications can have a weight average molecular weight of about 30,000 g/mol to about 80,000 g/mol. A low density polyethylene polymer intended for film applications can have a weight average molecular weight of about 60,000 g/mol to about 500,000 g/mol.

The low density polyethylene polymers suitable for use in the invention can have any suitable melt index. For example, the low density polyethylene polymer can have a melt index of about 0.2 to about 100 dg/min. As noted above, the melt index of the polymer is measured using ASTM Standard D1238-04c.

As noted above, one of the major distinctions between low density polyethylene and other ethylene polymers is a relatively high degree of long-chain branching within the polymer. The low density polyethylene polymers suitable for use in the invention can exhibit any suitable amount of long-chain branching, such as about 0.01 or more long-chain branches per 10,000 carbon atoms, about 0.1 or more long-chain branches per 10,000 carbon atoms, about 0.5 or more long-chain branches per 10,000 carbon atoms, about 1 or more long-chain branches per 10,000 carbon atoms, or about 4 or more long-chain branches per 10,000 carbon atoms. While there is not a strict limit on the maximum extent of long-chain branching that can be present in the low density polyethylene polymers suitable for use in the invention, the long-chain branching in many low density polyethylene polymers is less than about 100 long-chain branches per 10,000 carbon atoms.

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such compounds and compositions that provide faster and or higher polymer crystallization temperatures are popularly known as nucleators. Such compounds provide nucleation sites for crystal growth during cooling of a thermoplastic molten formulation.

In one embodiment, the extrusion composition and masterbatch composition contain at least one phosphate ester-based nucleating agent provided in the composition. For the extrusion composition, the phosphate ester-based nucleating agent is preferably at a use level of between about 0.01 and 0.15 parts by weight, in relation to 100 parts by weight of the resin. In another embodiment, up to about 0.3 parts of the phosphate ester-based nucleating agent may be used. For the masterbatch composition, the phosphate ester-based nucleating agent is preferably at a use level of between about 1 and 30 parts by weight, in relation to 100 parts by weight of the resin. In another embodiment, between about 5 and 20 parts of the phosphate ester-based nucleating agent may be used in the masterbatch composition.

The phosphate ester-based nucleating agent can be any suitable phosphate ester-based nucleating agent and in an amount suitable to the resin to be nucleated and the end use.

Phosphate esters suitable for use as the nucleating and/or clarifying agent include, but are not limited to, sodium 2,2'-methylene-bis-(4,6-di-tert-butylphenyl)phosphate (from Asahi Denka Kogyo K.K., known as "NA-11™), aluminum hydroxy bis 2,2'-methylene-bis-(4,6-di-tert-butylphenyl) phosphate (from Asahi Denka Kogyo K.K., known as NA-21™), and other such phosphate esters as disclosed for example in U.S. Pat. Nos. 5,342,868 and 4,463,113. NA-11 is a sodium phosphate ester with the following chemical:

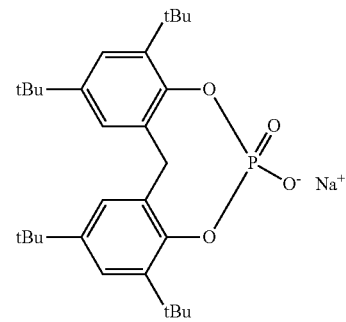 [SMILES: CC(C)(C)c1cc2c(c(C(C)(C)C)c1)OP(=O)([O-])Oc1c(cc(C(C)(C)C)cc1C(C)(C)C)C2 ; [Na+]]

Also useful is NA-21™ which is a blend of aluminum phosphate ester and lithium myristate with the chemical formula aluminum bis[2,2'-methylene-bis-(4,6-di-tert-butylphenyl)phosphate] and NA-27™ (also by Asahi Denka Kogyo K.K.) which is a blend of sodium phosphate ester-salt and lithium 12-hydroxystearate In another embodiment, the extrusion composition and masterbatch composition contain at least one benzoic acid salt-based nucleating agent provided in the composition. For the extrusion composition, the benzoic acid salt-based nucleating agent is preferably at a use level of between about 0.01 and 0.15 parts by weight, in relation to 100 parts by weight of the resin. In another embodiment, up to about 0.3 parts of the benzoic acid salt-based nucleating agent may be used. For the masterbatch composition, the benzoic acid salt-based nucleating agent is preferably at a use level of between about 1 and 30 parts by weight, in relation to 100 parts by weight of the resin. In another embodiment, between about 5 and 20 parts of the benzoic acid salt-based nucleating agent may be used in the masterbatch composition.

Benzoic acid salt-based nucleating agents may also be used. The type and amount of the benzoic acid salt-based nucleating agent depends on the resin and desired end use properties. As particles distributed within a matrix, non-melting nucleating agents create multiple single point nucleation sites for crystallized regions to grow around. Suitable nucleating agents include sodium benzoate which has the following chemical structure:

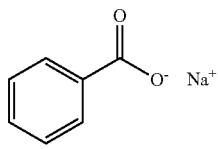

Lithium benzoate has the following chemical structure:

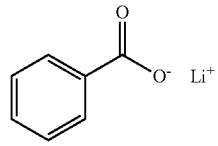

A benzoic acid salt-based nucleating agent may also have substituents on the aromatic ring. An example of a substituted benzoic acid nucleating agent is sodium 4-[(4-chlorobenzoyl)amino] benzoate. More information about benzoic acid salt-based nucleators can be found in U.S. Pat. Nos. 9,580,575 and 9,193,845, which are herein incorporated by reference.

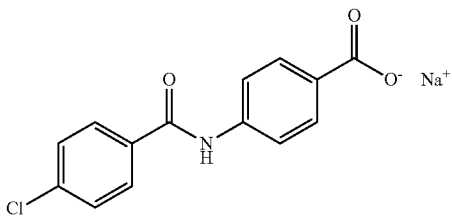 [SMILES: O=C([O-])c1ccc(NC(=O)c2ccc(Cl)cc2)cc1 ; [Na+]]

Preferably, the benzoic acid salt-based nucleating agent is a sodium benzoate, lithium benzoate, para-substituted benzoic acid salt or blends thereof.

The composition (both the extrusion and masterbatch compositions) contain at least one co-additive selected from the group consisting of poly(ethylene glycol) and copolymers containing segments of ethylene oxide, wherein the co-additive has a number average molecular weight of about 300 or more. For the extrusion composition the use level of this co-additive is preferably about 0.005 parts by weight or more, in relation to 100 parts by weight of the resin. In another embodiment, the co-additive is less than about 5% by weight of the extrusion composition. In another embodiment, the co-additive is between about 0.01% and about 5% by weight of the extrusion composition. For the masterbatch composition, the use level of this co-additive is preferably about 0.5 parts by weight or more, in relation to 100 parts by weight of the resin. In another embodiment, the co-additive is less than about 5% by weight of the masterbatch composition. In another embodiment, the co-additive is between about 0.01% and about 5% by weight of the masterbatch composition In one embodiment, the co-additive is selected from the group consisting of (a) poly(ethylene glycol) and their derivatives like poly(ethylene glycol) alkyl ether, poly(ethylene glycol) alkyl ester; (b) copolymers containing segments of ethylene oxide, such as block copolymers of ethylene oxide and propylene oxide, block copolymers of poly(ethylene glycol) and another polymer such as, but not limited to, polyethylene, polypropylene, polystyrene, poly (dimethylsiloxane), or polycaprolactone. In one embodiment, the co-additive has an average molecular weight of 300 g/mol, or more. In other applications of the invention, the co-additive has an average molecular weight of between 400 and 10,000,000 g/mol, more preferably between about 600 and 10,000 g/mol, more preferably between about 300 and 10,000 g/mol.

PEG's (polyethylene glycol's) general chemical structure is usually represented as follows:

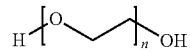

where 'n' is the repeating unit. The value of 'n' determines the molecular weight of the polymer. Such structure is also termed PEO (poly(ethylene oxide)) when molecular weight is high.

PEGs are used commercially in numerous applications and are available from several manufacturers, for example, PEGs are manufactured by Dow Chemical under the tradename Carbowax for industrial use, and Carbowax Sentry for food and pharmaceutical use. They vary in consistency from liquid to solid, depending on the molecular weight, as indicated by a number following the name.

Poloxamers are nonionic triblock copolymers composed of a central hydrophobic chain of polyoxypropylene (poly (propylene oxide)) flanked by two hydrophilic chains of polyoxyethylene (poly(ethylene oxide)). The word poloxamer was coined by the inventor, Irving Schmolka, who received the patent for these materials in 1973 (U.S. Pat. No. 3,740,421). Poloxamers are also known by the trade names SYNPERONICS™, PLURONICS™, and KOLLIPHOR™. The FLURONIC™ types are block copolymers based on ethylene oxide and propylene oxide available from BASF. They can function as antifoaming agents, wetting agents, dispersants, thickeners, and emulsifiers.

Phase separation between soluble clarifiers like diacetals of sorbitol and xylitol and the PP matrix can be enhanced by the use of selective co-additives like PEGs and Poloxamers, as demonstrated by Xu, et. al, in U.S. Pat. No. 8,022,133 B2. These co-additives favor the phase separation, therefore kicking the soluble clarifier crystals out of the PP earlier and at lower loadings. This effect allows for improved clarifying function of such clarifiers at relatively low loadings (improved low-level efficacy). This mechanism of phase separation can explain the improvements for soluble clarifiers but would not be applicable when using particulate clarifiers or nucleating agents which do not dissolve in the polymer matrix. Though many prior art references have disclosed the presence of PEG's as additional compounds like internal lubricants in polyolefin compositions, or as interfacial agents in fluoropolymers, none of the prior art references known to date have disclosed using this type of co-additives in combination with particulate nucleating agents showing improvements to the nucleation effect and thus improved mechanical properties of polyolefin compositions.

The present work shows that when adding different types of PEG's or poloxamers at loadings as low as 50 ppm (0.005% weight) and up to 2.5% weight, together with different particulate nucleating agents like phosphate ester salts and benzoic acid salts, further flexural modulus (stiffness) improvements are obtained, ranging between 3 and 12% higher, depending on the loadings of the nucleating agent and the polyolefin used.

In one embodiment, the at least one phosphate ester-based nucleating agent or at least one benzoic salt-based nucleating agent and the at least one co-additive selected from the group consisting of poly(ethylene glycol) and copolymers containing segments of ethylene oxide are part of a combined additive package, often called a non-dusting blend or one-pack. A one-pack is a composition of a number of individual components (additives), typically three or four, although any number from one to six or seven (or more) can be used. They are based upon the concept that the lowest melting component acts as a binder, or carrier, for the other components. The one-pack can also contain additives such as (but not limited to) anti-oxidant compositions, stabilizers, and acid scavengers. The one-pack contains additives with little to no carrier resin being necessary, allowing high concentration of active ingredients. The one-pack is commonly a full additive formulation in one pellet or granule.

The extrusion composition can be used in any suitable thermoplastic processing system to create finished goods (which may include pellets, granules, or any other form that is used for an additional extrusion process). Some example processes include injection molding, extrusion blow molding (EBM), blow molding, injection stretch blow molding (ISBM), and sheet extrusion-thermoforming.

A basic principle of injection molding is the ability of a thermoplastic to be softened by heating and forced under pressure into a mold cavity that is clamped together. The result is a thermoplastic that is solidified into the shape of the mold, thus creating the part. Resin pellets may be poured into a feed hopper, a large open bottomed container, which feeds the pellets down to the screw. As a motor turns the screw, the pellets are moved forward where they undergo extreme pressure and friction which, along with heaters around the screw, generate the heat that melts the pellets. Back pressure can be supplied from a hydraulic pump, to the screw as it melts the plastic to apply more energy resulting in more mixing of the melted plastic. The melted resin is forced out the other end of the cylinder through a nozzle (injection process) into a relatively cool mold, held closed by the clamping mechanism. The melt cools and hardens, and the mold opens, ejecting the molded part. Injection molding is widely used for manufacturing a variety of parts, from the smallest component to entire body panels of cars, for example.

In extrusion blow molding, plastic is melted and extruded into a hollow tube (called a parison). The parison is then captured by closing it into a cooled metal mold. Pressurized air is blown into the parison, inflating it into the shape of the mold. After the plastic has cooled sufficiently, the mold is opened and the part is ejected.

Blow molding is intended for use in manufacturing hollow plastic parts. Its main advantage is the ability to produce hollow shapes without having to join two or more separately molded parts. Examples of parts made by the EBM process include dairy containers, shampoo bottles, and hollow industrial parts such as drums. Extrusion is the process of compacting and melting a plastic material and forcing it through an orifice in a continuous fashion. Material is moved through the heated machine barrel by a helical screw (or screws), where it is heated and mixed to a homogeneous state and then forced through a die of the shape required for the finished product.

In the injection stretch blow molding process, the plastic is first molded into a preform using the injection molding process then stretched and blown into a bottle. This process can take place all in one stage, or the process can be two stages, with the preform being allowed to cool between the stages. In the two-stage system, the molded preforms are reheated (typically using infrared heaters) and stretched with a core rod while the bottles are being blown in two pressure stages. The stretching of some polymers results in strain hardening of the resin, allowing the bottles to resist deforming under the pressure formed by carbonated beverages. The main applications of this method are bottles, jars, and other containers.

Thermoforming is a process of forming thermoplastic sheet or film into a part. The sheet or film passes between heaters to its forming temperatures, then it is stretched over or into a temperature-controlled, single surface mold. The sheet is held against the mold surface until cooled, and then the formed part is trimmed from the sheet. The sheet can be formed to the contours of a mold by mechanical means (e.g., tools, plus, solid molds, etc.) or pneumatic means (e.g., pulling a vacuum or pushing with compressed air). Examples of thermoformed products are plastic or foam dinnerware, cups, meat and produce trays, egg cartons, refrigerator liners, computer housings, interior and exterior automotive parts, blisters for packaging, and others.

EXAMPLES

The following examples further illustrate the subject matter described above but, of course, should not be construed as in any way limiting the scope thereof. The following methods, unless noted, were used to determine the properties described in the following examples.

Each of the compositions was compounded by blending the components either using a Henschel high intensity mixer for about 2 minutes with a blade speed of about 2100 rpm, or low intensity mixed in a closed container for approximately one minute.

The compositions were then melt compounded using two methods:

Method 1 (for PP Homopolymers), using a DeltaPlast single-screw extruder, with a 25 mm diameter screw and a length to diameter ratio of 30:1. The barrel temperature of the extruder was ramped from 200 to 230° C. and a die temperature of 230° C.; the screw speed was set at about 130 rpm.

Method 2 (for the PP impact copolymers), using a Leistritz ZSE-18 co-rotating, fully intermeshing, parallel, twin-screw extruder with a 18 mm screw diameter and a length/diameter ratio of 40:1. The barrel temperature of the extruder was ranged from approximately 165° C. to approximately 175° C., the screw speed was set at approximately 500 rpm, the feed rate was 5 kg/hour resulting in a melt temperature of approximately 192° C.

The extrudate (in the form of a strand) for each polypropylene composition was cooled in a water bath and subsequently pelletized.

The pelletized compositions were then used to form plaques and bars by injection molding on a 40 ton Arburg injection molder with a 25.4 mm diameter screw.

50 mils plaques were molded with the different samples at 230° C. barrel temperature, injection speed: 2.4 cc/sec, backpressure: 7 bars, cooling: 21° C., cycle time: 27 sec. Samples were submitted to DSC analysis and optical properties were checked.

ISO shrinkage plaques were molded at 210° C. barrel temperature, target molding temp.: 200° C., injection speed: 38.4 cc/sec, backpressure: 7 bars, cooling: 40° C., cycle time: 60 sec. Their dimensions are about 60 mm long, 60 mm wide and 2 mm thick.

ISO flex bars were molded at 210° C. barrel temperature, injection speed: 23.2 cc/sec, backpressure: 7 bars, cooling: 40° C., cycle time: 60.05 sec. The resulting bars measured approximately 80 mm long, approximately 10 mm wide, and approximately 4.0 mm thick. The flexural modulus was measured.

Differential scanning calorimetry was performed following ASTM E794 in order to measure Peak Tc and ΔH of crystallization. DSC was measured using a Mettler Toledo DSC 700 with Perkin Elmer vented pans and lids. Briefly, an approximately 2.1 to 2.2 mg is heated from 50° C. to 220° C. at 20° C./minute until the sample reaches 220° C. The sample is then held at 220° C. for 2 minutes to ensure complete melting before cooling to 50° C. at 20° C./minute. The difference in energy between the sample and an empty control pan is measured on both the heating and cooling.

Haze of the plaques was measured using a BYK-Gardner Haze meter, according to ASTM 1003. The lower the haze, the better the optical properties of the tested parts.

Flexural modulus strength for the bars was measured according to ISO method 178.

Heat deflection temperature (HDT) for the bars was measured according to ISO method 75, condition: 0.45 MPa.

The notched Izod impact strength for the bars was measured according to ISO method 180/A. The notched Izod impact strength was measured at +23° C. on bars that had been conditioned at +23° C.

Example 1

The following example demonstrates the modification of a homopolymer PP composition and performance enhancements achieved, according to one method of the present invention.

Fourteen homopolymer compositions were produced as described in Tables 1 and 2, below

TABLE 1

Homopolymer polypropylene formulations.

| Component | Loading |
|---|---|
| Polypropylene homopolymer (PROFAX™ 6301) | Balance |
| Stabilizer 1 (IRGANOX® 1010) | 500 ppm |
| Stabilizer 2 (IRGAFOS® 168) | 1000 ppm |
| Acid Scavenger (Calcium Stearate) | 400 ppm |
| PEG1000 (using a 1% PEG1000 MB in a 35 MFR PP RCP carrier resin) | See Table 2 |
| Nucleator | See Table 2 |

The polypropylene used in these examples is PROFAX™ 6301, which is a 12 MFR PP homopolymer, available from LyondellBasell Industries.

IRGANOX® 1010 is a primary antioxidant available from BASF.

IRGAFOS® 168 is a secondary antioxidant available from BASF.

Calcium stearate is an acid scavenger available from PMC Biogenix.

PEG1000 is a Polyethylene glycol with average molecular weight of 1000 g/mol. Commercial examples of this material is CARBOWAX SENTRY Polyethylene Glycol 1000 NF available from the Dow Chemical Company.

When added in the formulation, the target loading of PEG1000 is 100 ppm.

The nucleating agents used in these examples are ADK STAB NA-21, NA-11, NA-27 available from Adeka.

Nucleating Agent 1 (N.A.1)—blend of calcium cyclohexane-1,2-dicarboxylate and zinc stearate.

Nucleating Agent 2 (N.A.2)—disodium bicyclo [2.2.1] heptane-2,3-dicarboxylate.

TABLE 2

Homopolymer polypropylene formulations.

| Sample | 1% PEG1000 MB (%) | NA-21 (ppm) | NA-11 (ppm) | NA-27 (ppm) | N.A.1 (ppm) | N.A.2 (ppm) |
|---|---|---|---|---|---|---|
| CS1 | | | | | | |
| CS1A | 1 | | | | | |
| 2 | | 1000 | | | | |
| 2A | 1 | 1000 | | | | |
| 3 | | | 1000 | | | |
| 3A | 1 | | 1000 | | | |
| 4 | | | | 1000 | | |
| 4A | 1 | | | 1000 | | |
| 5 | | | | | 1000 | |
| 5A | 1 | | | | 1000 | |
| 6 | | | | | | 1000 |
| 6A | 1 | | | | | 1000 |

Each of the compositions listed in Tables 1 and 2 were high intensity mixed, single screw extruded, and pelletized according to the above described procedure. The resulting pellets were used to injection mold plaques and bars, which were tested for optical properties, flexural modulus and thermal properties as described above. The examples with the same numbers (for example 4 and 4A) had the same compositions, but the A example included PEG1000.

TABLE 3

Mechanical and thermal properties of formulations.
Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| CS1 | 115.8 | | 57.3 | | 1374 | | |
| CS1A | 116.0 | 0.2 | 58.8 | +1.5 | 1377 | 3 | 0.0 |
| 2 | 126.3 | | 26.9 | | 1598 | | |
| 2A | 127.2 | 0.9 | 23.8 | −3.1 | 1675 | 77 | 4.8 |
| 3 | 127.8 | | 37.9 | | 1650 | | |
| 3A | 128.7 | 0.9 | 37.3 | −0.6 | 1768 | 118 | 7.2 |
| 4 | 128.8 | | 33.4 | | 1779 | | |
| 4A | 128.8 | 0 | 33.8 | +0.4 | 1801 | 22 | 1.2 |
| 5 | 124.3 | | 37.8 | | 1552 | | |
| 5A | 124.5 | 0.2 | 36.7 | −1.1 | 1537 | −15 | 0.0 |
| 6 | 128.7 | | 37.8 | | 1783 | | |
| 6A | 128.0 | −0.7 | 40.4 | +2.6 | 1760 | −23 | 0.0 |

The difference calculations in Table 3 are between the numbered sample (for example 4) and the same numbered sample with an A (for example 4A). As expected, with the addition of 100 ppm PEG1000, the crystallization temperature (Tc) and flexural modulus do not significantly improve, and the haze increased as shown in CS1 and CS1A. Table 3 also shows that when adding nucleating agents to this homopolymer, the Tc and flexural modulus increased, and the haze decreased as expected. The addition of PEG1000 did not affect the Tc or the flexural modulus in a significant way for the nucleated samples 5, and 6, as shown when comparing sample 5 with 5A, and sample 6 with 6A. Surprisingly, PEG1000 shows a synergistic effect with the nucleating agents present in samples 2, 3 and 4 (phosphate ester salts), imparting a higher increase in flexural modulus and some improvement to the Tc as is shown in Table 3. Comparing sample 2 to 2A, sample 3 to 3a and sample 4 to 4A, the flexural modulus increases by 77, 118 and 22 MPa, respectively.

Example 2

The following example demonstrates the modification of a heterophasic PP copolymer composition and performance enhancements achieved, according to the method of the present invention.

Seven heterophasic PP copolymer compositions were produced as described in Tables 3 and 4, below

TABLE 4

Heterophasic polypropylene copolymer formulations.

| Component | Loading |
| --- | --- |
| Heterophasic PP copolymer (INEOS ™ 500-GA20) | Balance |
| Stabilizer 1 (IRGANOX ® 1010) | 500 ppm |
| Stabilizer 2 (IRGAFOS ® 168) | 1000 ppm |
| Acid Scavenger (DHT-4A) | 400 ppm |
| PEG1000 (using a 1% PEG1000 MB in a 25 MFR PP RCP carrier resin) | See Table 5 |
| Nucleator | See Table 5 |

The polypropylene used in these examples is INEOS™ 500-GA-20, which is a 20 MFR heterophasic PP copolymer.

IRGANOX® 1010 is a primary antioxidant available from BASF

IRGAFOS® 168 is a secondary antioxidant available from BASF

DHT-4A is a hydrotalcite used as acid scavenger, available from Kisuma Chemicals.

PEG1000 is a Polyethylene glycol with average molecular weight of 1000 g/mol. Commercial examples of this material is CARBOWAX SENTRY™ Polyethylene Glycol 1000 NF available from the Dow Chemical Company.

When added in the formulation, the target loading of PEG1000 is 100 ppm.

The nucleating agents used in these examples are ADK STAB NA-21, NA-11, NA-71 available from Adeka.

TABLE 5

Heterophasic polypropylene copolymer formulations.

| Sample | 1% PEG1000 MB (%) | NA-11 (ppm) | NA-21 (ppm) | NA-71 (ppm) |
| --- | --- | --- | --- | --- |
| CS8 | | | | |
| 9 | | 1000 | | |
| 9A | 1 | 1000 | | |
| 10 | | | 1000 | |
| 10A | 1 | | 1000 | |
| 11 | | | | 1000 |
| 11A | 1 | | | 1000 |

Each of the compositions listed in Tables 4 and 5 were high intensity mixed, twin screw extruded, and pelletized according to the above described procedure. The resulting pellets were used to injection mold bars which were tested for HDT, flexural modulus and thermal properties as described above.

TABLE 6

Mechanical and thermal properties of formulations.

| Sample | Tc (° C.) | Increase in Tc (° C.) | HDT (° C.) | Increase in HDT (° C.) | Chord Modulus (MPa) | Increase in modulus (MPa) | Increase in modulus (%) |
| --- | --- | --- | --- | --- | --- | --- | --- |
| CS8 | 111.7 | | 73.3 | | 1091 | | |
| 9 | 124.2 | | 80.8 | | 1212 | | |
| 9A | 124.6 | 0.4 | 83.7 | 2.9 | 1264 | 52 | 4.3 |
| 10 | 122.6 | | 80.0 | | 1271 | | |
| 10A | 124.3 | 1.7 | 83.0 | 3.0 | 1319 | 48 | 3.8 |
| 11 | 124.6 | | 83.3 | | 1274 | | |
| 11A | 125.8 | 1.5 | 85.7 | 2.4 | 1326 | 52 | 4.1 |

As expected, when adding nucleating agents to this heterophasic polypropylene, the Tc, HDT and flexural modulus increased. The addition of PEG1000 shows a synergistic effect with the nucleating agents, imparting a higher increase in HDT and flexural modulus and some improvement to the Tc as is shown in Table 3. Comparing sample 9 to 9A, the HDT increased 3° and the flexural modulus increased 52 MPa, comparing sample 10 to sample 10a the HDT increased 3° and the flexural modulus increased 48 MPa and comparing sample 11 to 11A, the HDT increased 2.4° and the flexural modulus increased 52 MPa. This example confirms that the synergistic effect between the PEG and the nucleating agents is present not only in a homopolymer PP but also in a heterophasic PP copolymer. This example also shows that the effect is present when using a different type of acid scavenger.

Example 3

The following example demonstrates the modification of a homopolymer PP composition and performance enhancements achieved according to the method of the present invention. In this example, a different type of PEG and a different type of acid scavenger were used.

Eight homopolymer compositions were produced as described in Tables 7 and 8, below

TABLE 7

Homopolymer polypropylene formulations.

| Component | Loading |
|---|---|
| Polypropylene (PROFAX ™ 6301) | Balance |
| Stabilizer 1 (IRGANOX ® 1010) | 500 ppm |
| Stabilizer 2 (IRGAFOS ® 168) | 1000 ppm |
| Acid Scavenger (DHT-4V) | 400 ppm |
| PEG3350 | See Table 8 |
| Nucleator | See Table 8 |

The homopolymer polypropylene used in these examples is PROFAX™ 6301, which is a 12 MFR PP homopolymer available from LyondellBasell Industry.

DHT-4V is a hydrotalcite used as acid scavenger available from Kisuma Chemicals.

PEG3350 is a Polyethylene glycol with average molecular weight of 3350 g/mol. Commercial example of this material is CARBOWAX SENTRY™ Polyethylene Glycol 3350 available from the Dow Chemical Company.

The nucleating agents used in these examples are phosphate esters ADK STAB NA-21 & NA-11, available from Adeka, and the phosphate ester Eustab NA-50 available from Eutec Chemical Co.

TABLE 8

Homopolymer polypropylene formulations.

| Sample | PEG3350 (ppm) | NA-21 (ppm) | NA-50 (ppm) | NA-11 (ppm) |
|---|---|---|---|---|
| CS12 | | | | |
| CS12A | 100 | | | |
| 13 | | 1000 | | |
| 13A | 100 | 1000 | | |
| 14 | | | 1000 | |
| 14A | 100 | | 1000 | |
| 15 | | | | 1000 |
| 15A | 100 | | | 1000 |

Each of the compositions listed in Tables 7 and 8 were high intensity mixed, single screw extruded, and pelletized according to the above described procedure. The resulting pellets were used to form plaques and bars which were tested for optical properties, flexural modulus and thermal properties as described above.

TABLE 9

Thermal, optical and mechanical properties of formulations. Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| CS12 | 117.0 | | 57.9 | | 1311 | | |
| CS12A | 116.0 | −1.0 | 59.6 | +1.7 | 1272 | −39 | −3.0 |
| 13 | 125.7 | | 26.4 | | 1593 | | |
| 13A | 127.2 | 1.5 | 22.9 | −3.5 | 1691 | 98 | 6.2 |
| 14 | 124.7 | | 30.3 | | 1539 | | |
| 14A | 126.5 | 1.8 | 24.1 | −6.2 | 1649 | 110 | 7.1 |
| 15 | 129.2 | | 27.6 | | 1695 | | |
| 15A | 129.3 | 0.1 | 32.0 | +4.4 | 1816 | 121 | 7.1 |

Table 9 shows the performance of the different formulations prepared with DHT-4V as acid scavenger and adding PEG3350. When comparing the comparative sample CS12 (un-nucleated homopolymer) with CS12A (the un-nucleated resin with 100 ppm of PEG3350), the crystallization temperature, haze and flexural modulus were adversely affected. As expected, with the addition of the different nucleating agents, the crystallization temperature and flexural modulus of the homopolymer PP increased and the haze decreased (lower haze values are desired). Surprisingly, the samples with nucleating agent showed improved performance with the addition of PEG3350, imparting a higher increase in flexural modulus and crystallization temperature (Tc). Comparing sample 13 with sample 13A, the Tc increased by 1.5° C., the haze decreased by 3.5 units and the flexural modulus increased by 98 MPa (6.2% improvement). Comparing sample 14 with 14A, the Tc increased 1.8° C., the haze decreased 6.2 units and the flexural modulus increased 110 MPa (7.1% improvement) and comparing sample 15 with sample 15A, the Tc did not show a significant change, the haze increased 4.4 units and the flexural modulus increased by 121 MPa (7.1% improvement).

Example 4

The following example demonstrates the modification of a homopolymer PP composition and performance enhancements achieved according to the method of the present invention. For this example, a different acid scavenger and the PEG3350 were used.

Eight homopolymer compositions were produced as described in Tables 10 and 11, below:

TABLE 10

Homopolymer polypropylene formulations.

| Component | Loading |
|---|---|
| Polypropylene (PROFAX ™ 6301) | Balance |
| Stabilizer 1 (IRGANOX ® 1010) | 500 ppm |
| Stabilizer 2 (IRGAFOS ® 168) | 1000 ppm |
| Acid Scavenger (CaSt) | 400 ppm |
| PEG3350 | See Table 11 |
| Nucleator | See Table 11 |

CaSt is Calcium stearate, used as acid scavenger and available from PMC Biogenix.

PEG3350 is a Polyethylene glycol with average molecular weight of 3350 g/mol. Commercial example of this material is CARBOWAX SENTRY™ Polyethylene Glycol 3350 available from the Dow Chemical Company.

The nucleating agents used in these examples are phosphate esters ADK STAB NA-21 & NA-11, available from Adeka and NA-50 available from Eutec Chemical Co.

TABLE 11

Hompolymer polypropylene formulations.

| Sample | PEG3350 (ppm) | NA-21 (ppm) | NA-50 (ppm) | NA-11 (ppm) |
|---|---|---|---|---|
| CS16 | | | | |
| CS16A | 100 | | | |
| 17 | | 1000 | | |
| 17A | 100 | 1000 | | |
| 18 | | | 1000 | |

TABLE 11-continued

Hompolymer polypropylene formulations.

| Sample | PEG3350 (ppm) | NA-21 (ppm) | NA-50 (ppm) | NA-11 (ppm) |
|---|---|---|---|---|
| 18A | 100 | | 1000 | |
| 19 | | | | 1000 |
| 19A | 100 | | | 1000 |

Each of the compositions listed in Tables 10 and 11 were high intensity mixed, single screw extruded, and pelletized according to the above described procedure. The resulting pellets were injection molded to form plaques and bars which were tested for optical properties, flexural modulus and thermal properties as described above.

TABLE 12

Mechanical, optical and thermal properties of formulations.
Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| CS16 | 115.5 | | 60.1 | | 1269 | | |
| CS16A | 114.5 | −1.0 | 60.0 | +0.1 | 1258 | −11 | −0.9 |
| 17 | 126.3 | | 25.4 | | 1615 | | |
| 17A | 127.2 | +0.9 | 23.0 | −1.6 | 1710 | 95 | 5.9 |
| 18 | 125.2 | | 28.0 | | 1571 | | |
| 18A | 127.2 | +2.0 | 23.1 | −4.9 | 1686 | 115 | 7.3 |
| 19 | 127.5 | | 34.6 | | 1677 | | |
| 19A | 128.2 | +0.7 | 34.9 | +0.3 | 1784 | 107 | 6.4 |

Table 12 shows the performance of the different formulations prepared with calcium stearate as acid scavenger and adding PEG3350. As expected and shown when comparing CS16 (the un-nucleated homopolymer) with CS16A, the addition of 100 ppm PEG3350 to the polypropylene without nucleating agents did not improve the crystallization temperature, haze or flexural modulus. The samples with the nucleating agent show a synergistic effect when PEG3350 is present, imparting a higher increase in flexural modulus and Tc. Comparing sample 17 with 17A, the Tc and Haze improved and the flexural modulus significantly improved by 95 MPa (around 5.9% improvement), comparing sample 18 and 18A, the Tc improved 2° C. and the haze improved 4.9 units, while the flexural modulus improved 115 MPa (around 7.3% improvement) and comparing samples 19 and 19A, the Tc and Haze showed modest improvements, while the flexural modulus improved by 107 MPa (around 6.4% improvement). Example 3 and 4 confirm that the synergistic effect between PEG and the nucleating agents is present regardless of the acid scavenger used and the type of PEG used.

Example 5

The following example demonstrates the modification of a homopolymer PP composition and performance enhancements achieved according to the method of the present invention. This example demonstrates the effect of different loadings of PEG3350 when used in combination with different loadings of the nucleating agent.

Thirty-seven homopolymer compositions were produced as described in Tables 13 and 14, below:

TABLE 13

Homopolymer polypropylene formulations.

| Component | Loading |
|---|---|
| Polypropylene (PROFAX ™ 6301) | Balance |
| Stabilizer 1 (IRGANOX ® 1010) | 500 ppm |
| Stabilizer 2 (IRGAFOS ® 168) | 1000 ppm |
| Acid Scavenger (DHT-4V) | 400 ppm |
| PEG3350 | See Table 14 |
| Nucleator (NA-21) | See Table 14 |

TABLE 14

Hompolymer polypropylene formulations.

| Sample | PEG3350 (ppm) | NA-21 (ppm) |
|---|---|---|
| CS20 | | |
| CS20A | 50 | |
| CS20B | 100 | |
| CS20C | 250 | |
| CS20D | 500 | |
| CS20E | 1000 | |
| 21 | | 250 |
| 21A | 50 | 250 |
| 21B | 100 | 250 |
| 21C | 250 | 250 |
| 21D | 500 | 250 |
| 21E | 1000 | 250 |
| 22 | | 500 |
| 22B | 100 | 500 |
| 22C | 250 | 500 |
| 22D | 500 | 500 |
| 22E | 1000 | 500 |
| 23 | | 750 |
| 23B | 100 | 750 |
| 23C | 250 | 750 |
| 23D | 500 | 750 |
| 23E | 1000 | 750 |
| 24 | | 1000 |
| 24B | 100 | 1000 |
| 24C | 250 | 1000 |
| 24D | 500 | 1000 |
| 24E | 1000 | 1000 |
| 24F | 2000 | 1000 |
| 24G | 5000 | 1000 |
| 24H | 10000 | 1000 |
| 24J | 25000 | 1000 |
| 25 | | 1500 |
| 25A | 50 | 1500 |
| 25B | 100 | 1500 |
| 25C | 250 | 1500 |
| 26 | | 2000 |
| 26B | 100 | 2000 |

Each of the compositions listed in Tables 13 and 14 were high intensity mixed, single screw extruded, and pelletized according to the above described procedure. The resulting pellets were injection molded to form plaques and bars, which were tested for optical properties, flexural modulus and thermal properties as described above.

TABLE 15

Mechanical, optical and thermal properties of formulations. Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| CS20 | 117.0 | | 57.9 | | 1311 | | |
| CS20A | 116.0 | −1.0 | 59.6 | +1.7 | 1272 | −39 | −3.0 |
| CS20B | 115.0 | −2.0 | 58.4 | +0.5 | 1265 | −46 | −3.5 |
| CS20C | 114.7 | −2.3 | 57.3 | −0.6 | 1267 | −44 | −3.4 |
| CS20D | 114.3 | −2.7 | 57.0 | −0.9 | 1255 | −56 | −4.3 |
| CS20E | 114.2 | −2.8 | 57.3 | −0.6 | 1269 | −42 | −3.2 |
| 21 | 122.0 | | 33.4 | | 1473 | | |
| 21A | 125.0 | 3.0 | 31.4 | −2.0 | 1563 | 90 | 6.1 |
| 21B | 124.8 | 2.8 | 29.4 | −4.0 | 1584 | 111 | 7.5 |
| 21C | 125.0 | 3.0 | 29.4 | −4.0 | 1587 | 114 | 7.7 |
| 21D | 125.2 | 3.2 | 30.0 | −3.4 | 1604 | 131 | 8.9 |
| 21E | 125.7 | 3.7 | 32.3 | −1.1 | 1619 | 146 | 9.9 |
| 22 | 123.5 | | 29.3 | | 1514 | | |
| 22B | 125.3 | 1.8 | 25.9 | −3.4 | 1583 | 69 | 4.6 |
| 22C | 125.7 | 2.2 | 25.7 | −3.6 | 1624 | 110 | 7.3 |
| 22D | 126.2 | 2.7 | 26.0 | −3.3 | 1643 | 129 | 8.5 |
| 22E | 126.3 | 2.8 | 28.6 | −0.7 | 1686 | 172 | 11.4 |
| 23 | 123.5 | | 30.7 | | 1496 | | |
| 23B | 125.5 | 2.0 | 25.5 | −5.2 | 1583 | 87 | 5.8 |
| 23C | 126.2 | 2.7 | 25.3 | −5.4 | 1616 | 120 | 8.0 |
| 23D | 126.5 | 3.0 | 25.9 | −4.8 | 1641 | 145 | 9.7 |
| 23E | 126.8 | 3.3 | 28.5 | −2.2 | 1675 | 179 | 12.0 |
| 24 | 124.2 | | 27.9 | | 1529 | | |
| 24B | 125.7 | 1.5 | 24.3 | −3.6 | 1596 | 67 | 4.4 |
| 24C | 126.3 | 2.1 | 24.1 | −3.8 | 1632 | 103 | 6.7 |
| 24D | 126.5 | 2.3 | 24.9 | −3.0 | 1671 | 142 | 9.3 |
| 24E | 127.2 | 3.0 | 27.7 | −0.2 | 1687 | 158 | 10.3 |
| 24F | 127.8 | 3.6 | 30.6 | +2.7 | 1710 | 181 | 11.8 |
| 24G | 127.3 | 3.1 | 45.4 | +17.5 | 1729 | 200 | 13.1 |
| 24H | 127.5 | 3.3 | 53.5 | +25.6 | 1715 | 186 | 12.2 |
| 24J | 127.8 | 3.6 | 74.7 | +46.8 | 1693 | 164 | 10.7 |
| 25 | 126.0 | | 23.9 | | 1689 | | |
| 25A | 127.0 | 1.0 | 21.2 | −2.7 | 1740 | 51 | 3.0 |
| 25B | 127.2 | 1.2 | 21.1 | −2.8 | 1762 | 73 | 4.3 |
| 25C | 127.5 | 1.5 | 21.5 | −2.4 | 1786 | 97 | 5.7 |
| 26 | 126.7 | | 21.8 | | 1687 | | |
| 26B | 127.3 | 0.6 | 20.4 | −1.4 | 1754 | 67 | 4.0 |

Table 15 shows the performance of the different formulations prepared varying the loading of NA-21 and PEG3350. As shown when comparing CS20 (the un-nucleated homopolymer) with CS20A, CS20B, CS20C, CS20D, CS20E, the addition of PEG3350 at different loadings, to the polypropylene without nucleating agents, did not improve the crystallization temperature, haze or flexural modulus. In fact, higher loadings of PEG3350 adversely affected the Tc and the flexural modulus. The samples with the nucleating agent NA-21 at loadings from 250 to 2000 ppm, show a synergistic effect when PEG3350 is present at loadings between 50 and 1000 ppm, and with increasing loadings of PEG3350 increasing Tc and flexural modulus were obtained, with similar or improved haze (lower haze values). When adding PEG3350 at levels above 1000 ppm and up to 25000 ppm (2.5%), the optical properties (haze) of the resin are adversely affected, but the Tc and flexural modulus continue to show improvements. Other processing issues start manifesting at these high loadings, like screw slippage, related to the high amount of PEG in the system.

Example 6

The following example demonstrates the modification of a heterophasic PP copolymer composition and performance enhancements achieved according to the method of the present invention. This example demonstrates the effect of different loadings of PEG3350 when used in combination with different loadings of the nucleating agent.

Twenty-one heterophasic PP copolymer compositions were produced as described in Tables 16 and 17, below

TABLE 16

Heterophasic polypropylene copolymer formulations.

| Component | Loading |
|---|---|
| Polypropylene (REPOL ™ B120MA) | Balance |
| Mineral oil (DRAKEOL ™ 34) | 200 ppm |
| PEG3350 | See Table 17 |
| Nucleator (NA-21) | See Table 17 |

REPOL™ B120MA is a 12 MFR hetorophasic PP copolymer, available from Reliance Industries LTD. This is a commercial resin in pellets form which is already stabilized with acid scavenger and antioxidants.

DRAKEOL™ 34 is a mixture of paraffinic and naphthenic hydrocarbons (mineral oil), available from Calumet Lubricants.

PEG3350 is a Polyethylene glycol with average molecular weight of 3350 g/mol. Commercial example of this material is CARBOWAX SENTRY™ Polyethylene Glycol 3350 available from the Dow Chemical Company.

The nucleating agent used in these examples is ADK STAB NA-21, available from Adeka.

TABLE 17

Heterophasic polypropylene copolymer formulations.

| Sample | PEG3350 (ppm) | NA-21 (ppm) |
|---|---|---|
| CS27 | | |
| 28 | | 250 |
| 28A | 100 | 250 |
| 28B | 250 | 250 |
| 28C | 500 | 250 |
| 28D | 1000 | 250 |
| 29 | | 500 |
| 29A | 100 | 500 |
| 29B | 250 | 500 |
| 29C | 500 | 500 |
| 29D | 1000 | 500 |
| 30 | | 750 |
| 30A | 100 | 750 |
| 30B | 250 | 750 |
| 30C | 500 | 750 |
| 30D | 1000 | 750 |
| 31 | | 1000 |
| 31A | 100 | 1000 |
| 31B | 250 | 1000 |
| 31C | 500 | 1000 |
| 31D | 1000 | 1000 |

Each of the compositions listed in Tables 16 and 17 were hand mixed in a close container, twin screw extruded, and pelletized according to the above described procedure. The resulting pellets were injection molded to form bars, which were tested for flexural modulus.

TABLE 18

Mechanical properties of formulations.

| Sample | Chord Modulus (MPa) | Increase in modulus (MPa) | Increase in modulus (%) |
|---|---|---|---|
| CS27 | 1144 | | |
| 28 | 1312 | | |
| 28A | 1411 | 99 | 7.5 |
| 28B | 1440 | 128 | 9.8 |
| 28C | 1444 | 132 | 10.1 |
| 28D | 1443 | 131 | 10.0 |
| 29 | 1378 | | |
| 29A | 1451 | 73 | 4.2 |
| 29B | 1439 | 61 | 4.4 |
| 29C | 1494 | 116 | 8.4 |
| 29D | 1498 | 120 | 8.7 |
| 30 | 1389 | | |
| 30A | 1443 | 54 | 3.9 |
| 30B | 1505 | 116 | 8.4 |
| 30C | 1511 | 122 | 8.8 |
| 30D | 1530 | 141 | 10.2 |
| 31 | 1437 | | |
| 31A | 1527 | 90 | 6.3 |
| 31B | 1547 | 110 | 7.7 |
| 31C | 1577 | 140 | 9.7 |
| 31D | 1545 | 108 | 7.5 |

Table 18 shows the performance of the different formulations prepared varying the loading of NA-21 and PEG3350 in the heterophasic polypropylene copolymer. As expected, when adding the nucleating agent, the flexural modulus increased with increasing NA-21 loadings, as can be seen when comparing CS27 with samples 28, 29, 30 and 31. The samples with the nucleating agent NA-21 at loadings from 250 to 1000 ppm, show a synergistic effect with the varying loadings of PEG3350. In general, with increasing loading of PEG3350 in the presence of all the different loadings of NA-21, the flexural modulus increased, as one can see when comparing sample 28 with 28A, 28B, 28C, 28D, comparing sample 29 with 29A, 29B, 29C, 29D, comparing sample 30 with 30A, 30B, 30C, 30D and comparing sample 31 with 31A, 31B, 31C and 31 D. This example confirms that the synergistic effect between PEG3350 and NA-21 are present in both homopolymer polypropylenes and heterophasic polypropylene copolymers.

Example 7

The following example demonstrates the modification of a homopolymer PP composition and performance enhancements achieved according to the method of the present invention. This example demonstrates the effect of different loadings of PLURONIC™ F108 when used in combination with different loadings of the nucleating agent.

Eight homopolymer compositions were produced as described in Tables 19 and 20, below:

TABLE 19

Homopolymer polypropylene formulations.

| Component | Loading |
|---|---|
| Polypropylene (PROFAX™ 6301) | Balance |
| Stabilizer 1 (IRGANOX ® 1010) | 500 ppm |
| Stabilizer 2 (IRGAFOS ® 168) | 1000 ppm |
| Acid Scavenger (DHT-4V) | 400 ppm |
| PLURONIC™ F108 | See Table 20 |
| Nucleator (NA-21) | See Table 20 |

PLURONIC™ F108 is a difunctional block copolymer based on ethylene oxide and propylene oxide available from BASF.

TABLE 20

Homopolymer polypropylene formulations.

| Sample | PLURONIC™ F108 (ppm) | NA-21 (ppm) |
|---|---|---|
| 32 | | 500 |
| 32A | 100 | 500 |
| 32B | 250 | 500 |
| 32C | 500 | 500 |
| 33 | | 1000 |
| 33A | 100 | 1000 |
| 33B | 250 | 1000 |
| 33C | 500 | 1000 |

Each of the compositions listed in Tables 19 and 20 were high intensity mixed, single screw extruded, and pelletized according to the above described procedure. The resulting pellets were injection molded to form plaques and bars, which were tested for optical properties, flexural modulus and thermal properties as described above.

TABLE 21

Mechanical, optical and thermal properties of formulations.
Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| 32 | 122.7 | | 31.9 | | 1452 | | |
| 32A | 125.0 | 2.3 | 27.4 | −4.5 | 1528 | 76 | 5.2 |
| 32B | 125.3 | 2.6 | 26.9 | −5.0 | 1570 | 118 | 8.1 |
| 32C | 125.5 | 2.8 | 27.1 | −4.8 | 1583 | 131 | 9.0 |
| 33 | 124.5 | | 26.9 | | 1522 | | |
| 33A | 125.7 | 1.2 | 23.5 | −3.4 | 1576 | 54 | 3.5 |
| 33B | 126.0 | 1.5 | 22.8 | −4.1 | 1566 | 44 | 2.9 |
| 33C | 126.5 | 2.0 | 23.6 | −3.3 | 1602 | 80 | 5.3 |

Table 21 shows the performance of the different formulations prepared varying the loading of NA-21 and PLURONIC™ F108. The presence of PLURONIC™ F108 shows a similar synergistic effect than the PEG's tested. When PLURONIC™ F108 is present at loadings between 100 and 500 ppm together with NA-21, increased Tc and flexural modulus were obtained, with improved haze (lower haze values). This can be seen when comparing sample 32 with 32A, 32B, 32C and comparing sample 33 with 33A, 33B and 33C.

Example 8

The following example demonstrates the modification of a homopolymer PP composition and performance enhancements achieved according to the method of the present invention. This example used two different types of nucleating agents and the PEG3350.

Twelve homopolymer compositions were produced as described in Tables 22 and 23, below

TABLE 22

Homopolymer polypropylene formulations.

| Component | Loading |
|---|---|
| Polypropylene (PROFAX ™ 6301) | Balance |
| Stabilizer 1 (IRGANOX ® 1010) | 500 ppm |
| Stabilizer 2 (IRGAFOS ® 168) | 1000 ppm |
| PEG3350 | See Table 23 |
| Nucleator (NaBz) | See Table 23 |

The nucleating agent used in these examples is NaBz (sodium benzoate) available from Emerald Kalama Chemical.

TABLE 23

Hompolymer polypropylene formulations.

| Sample | PEG3350 (ppm) | NaBz (ppm) |
|---|---|---|
| 34 | | 500 |
| 34A | 100 | 500 |
| 34B | 250 | 500 |
| 34C | 500 | 500 |
| 34D | 1000 | 500 |
| 34E | 2000 | 500 |
| 35 | | 1000 |
| 35A | 100 | 1000 |
| 35B | 250 | 1000 |
| 35C | 500 | 1000 |
| 35D | 1000 | 1000 |
| 35E | 2000 | 1000 |

Each of the compositions listed in Tables 22 and 23 were high intensity mixed, single screw extruded, and pelletized according to the above described procedure. The resulting pellets were injection molded to form plaques and bars which were tested for optical properties, flexural modulus and thermal properties as described above.

TABLE 24

Mechanical, optical and thermal properties of formulations. Haze was measured using a 50 mils plaque.

| Sample | Tc (° C.) | Increase in Tc (° C.) | Haze (%) | Haze difference (% units) | Chord Modulus (MPa) | Increase in modulus (MPa) | Increase in modulus (%) |
|---|---|---|---|---|---|---|---|
| 34 | 125.5 | | 46.8 | | 1480 | | |
| 34A | 126.0 | 0.5 | 45.2 | −1.6 | 1531 | 51 | 3.4 |
| 34B | 125.7 | 0.2 | 45.8 | −1.0 | 1526 | 46 | 3.1 |
| 34C | 125.5 | 0 | 46.0 | −0.8 | 1534 | 54 | 3.6 |
| 34D | 125.0 | −0.5 | 46.5 | −0.3 | 1514 | 34 | 2.3 |
| 34E | 124.7 | −0.8 | 48.7 | 1.9 | 1510 | 30 | 2.0 |
| 35 | 127.5 | | 47.5 | | 1514 | | |
| 35A | 127.3 | −0.2 | 47.4 | −0.1 | 1570 | 56 | 3.7 |
| 35B | 127.2 | −0.3 | 47.6 | 0.1 | 1586 | 72 | 4.8 |
| 35C | 126.7 | −0.8 | 47.1 | −0.4 | 1586 | 72 | 4.8 |
| 35D | 126.3 | −1.2 | 47.7 | 0.2 | 1600 | 86 | 5.7 |
| 35E | 126.2 | −1.3 | 49.4 | 1.9 | 1580 | 66 | 4.4 |

Table 24 shows the performance of the different formulations prepared with sodium benzoate at two different loadings, adding PEG3350 at varying loadings. When comparing sample 34 with 34A, 34B, 34C, 34D and 34E, one can see that the composition with sodium benzoate at 500 ppm shows improved Tc and haze and higher flexural modulus with increasing loading of PEG3350 going from 100 to 500 ppm, and that when adding 1000 and 2000 ppm of PEG3350, the Tc, haze and flexural modulus show small improvements. When comparing sample 35 with 35A, 35B, 35C, 35D and 35E, one can see that even though the Tc and haze seem to deteriorate. NaBz at 1000 ppm shows improved flexural modulus with increasing loading of PEG3350.

PE Examples

The following examples further illustrate the subject matter described above but, of course, should not be construed as in any way limiting the scope thereof. The following methods, unless noted, were used to determine the properties described in the following examples.

The polyethylene resins were ground to 35 mesh using a disc attrition mill.

Each of the compositions was compounded by blending the components either using a Henschel high intensity mixer for about 2 minutes with a blade speed of about 2100 rpm.

The compositions were then melt compounded using a DeltaPlast single-screw extruder, with a 25 mm diameter screw and a length to diameter ratio of 30:1. The barrel temperature of the extruder was ramped from 160 to 180° C. and a die temperature of 180° C.; the screw speed was set at about 130 rpm.

The extrudate (in the form of a strand) for each polyethylene composition was cooled in a water bath and subsequently pelletized.

The pelletized compositions were then used to form plaques and bars by injection molding on a 40 ton Arburg injection molder with a 25.4 mm diameter screw.

ISO shrinkage plaques were molded at 210° C. barrel temperature, target molding temp.: 200° C., injection speed: 38.4 cc/sec, backpressure: 7 bars, cooling: 40° C., cycle time: 60 sec. Their dimensions are about 60 mm long, 60 mm wide and 2 mm thick. These plaques were used to measure Recrystallization Temperature and Bi-directional stiffness.

ISO flex bars were molded at 210° C. barrel temperature, injection speed: 23.2 cc/sec, backpressure: 7 bars, cooling: 40° C., cycle time: 60.05 sec. The resulting bars measured approximately 80 mm long, approximately 10 mm wide, and approximately 4.0 mm thick. The flexural modulus and impact resistance were measured.

The peak polymer recrystallization temperature (Tc) for the thermoplastic polymer compositions was measured using a differential scanning calorimeter (Mettler-Toledo DSC822 differential scanning calorimeter). In particular, a sample was taken from the target part and heated at a rate of 20° C./minute from a temperature of 60° C. to 220° C., held at 220° C. for two minutes, and cooled at a rate of approximately 10° C./minute to a temperature of 60° C. The temperature at which peak polymer crystal reformation occurred (which corresponds to the peak polymer recrystallization temperature) was recorded for each sample.

Flexural properties testing (reported as 1% secant modulus) was performed on the above-mentioned plaques using an MTS Q-Test-5 instrument with a span of 32 mm, a fixed deflection rate of 8.53 mm/minute, and a nominal sample width of 50.8 mm. Samples were prepared by cutting square sections (approximately 50 mm×50 mm) from the centers of the plaques to obtain an isotropically sized sample. In addition to testing the samples across the machine/flow direction as is customary (labeled as "Transverse Direction" in the results Table), samples were also tested by flexing across the transverse direction to flow to measure stiffness in that direction as well (labeled as "Machine Direction" in the results Table) in order to examine the bi-directional stiffness of the plaques.

The notched Izod impact strength for the bars was measured according to ISO method 180/A. The notched Izod impact strength was measured at +23° C. on bars that had been conditioned at +23° C.

Example 9

The following example demonstrates the modification of a high density polyethylene composition and performance enhancements achieved, according to the method of the present invention. This example used calcium stearate as the acid scavenger and one type of polyethylene glycol, added using a concentrate.

Eight polyethylene compositions were produced as described in Tables 25 and 26, below:

TABLE 25

High density polyethylene formulations.

| Component | Loading |
| --- | --- |
| HDPE (Dow DMDA-8007) | Balance |
| Stabilizer 1 (IRGANOX ® 1010) | 500 ppm |
| Stabilizer 2 (IRGAFOS ® 168) | 1000 ppm |
| Acid Scavenger (CaSt) | 400 ppm |
| PEG1000 (using a 1% PEG1000 MB in a 35 MFR PP RCP carrier resin) | See Table 26 |
| Nucleator | See Table 26 |

The high density polyethylene used in these examples is Dow DMDA-8007, which is an 8.3 MI2.16, 0.967 g/cm$^3$ polyethylene, available from The Dow Chemical Company.

IRGANOX® 1010 is a primary antioxidant available from BASF
IRGAFOS® 168 is a secondary antioxidant available from BASF
Calcium stearate is an acid scavenger available from PMC Biogenix.
PEG1000 is a Polyethylene glycol with average molecular weight of 1000 g/mol. Commercial example of this material is CARBOWAX SENTRY™ Polyethylene Glycol 1000 NF available from the Dow Chemical Company.
Nucleating Agent 1 (N.A.1)—blend of calcium cyclohexane-1, 2-dicarboxylate and zinc stearate.

Nucleating Agent 2 (N.A.2)—disodium bicyclo [2.2.1] heptane-2, 3-dicarboxylate.
Nucleating Agent 4 (N.A.3)—blend containing sodium 4-[(4-chlorobenzoyl)amino] benzoate as the main component

TABLE 26

High density polyethylene formulations.

| Sample | 1% PEG1000 MB (%) | N.A.3 (ppm) | N.A.1 (ppm) | N.A.2 (ppm) |
| --- | --- | --- | --- | --- |
| CS36 | | | | |
| CS36A | 1 | | | |
| 37 | | 1000 | | |
| 37A | 1 | 1000 | | |
| 38 | | | 1000 | |
| 38A | 1 | | 1000 | |
| 39 | | | | 1000 |
| 39A | 1 | | | 1000 |

Once the resin was ground, each of the compositions listed in Tables 25 and 26 were high intensity mixed, single screw extruded, and pelletized according to the above described procedure. The resulting pellets were used to form plaques and bars. which were tested for bi-directional flexural modulus and thermal properties as described above.

TABLE 27

Mechanical and thermal properties of formulations.

| Sample | $T_c$ (° C.) | Increase in Tc (° C.) | Machine Direction 1% secant modulus (MPa) | Increase in MD 1% secant modulus (MPa) | Increase in MD 1% secant modulus (%) | Transverse Direction 1% secant modulus (MPa) | Increase in TD 1% secant modulus (MPa) | Increase in TD 1% secant modulus (%) |
| --- | --- | --- | --- | --- | --- | --- | --- | --- |
| CS36 | 119.3 | | 1035 | | | 1072 | | |
| CS36A | 119.0 | −0.3 | 1008 | −27 | −2.6 | 1060 | −12 | −1.1 |
| 37 | 120.7 | | 1297 | | | 1269 | | |
| 37A | 120.7 | 0 | 1331 | 34 | 2.6 | 1221 | −48 | −3.8 |
| 38 | 122.0 | | 1130 | | | 1539 | | |
| 38A | 122.0 | 0 | 1150 | 20 | 1.8 | 1526 | −13 | −0.1 |
| 39 | 121.2 | | 1101 | | | 1527 | | |
| 39A | 120.7 | −0.5 | 1079 | −22 | −2.0 | 1566 | 39 | 2.6 |

Table 27 shows the testing results for the high density polyethylene formulations. As expected, with the addition of 100 ppm PEG1000 to the high density polyethylene, the crystallization temperature and flexural modulus do not improve, and impact has an adverse effect, as shown in CS36 and CS36A. Also as expected, when the nucleating agents were added, an increase in the machine direction (MD) flexural modulus and the transverse direction (TD) flexural modulus was obtained. It is known that depending on the type of crystal growth orientation imparted by the nucleating agent, they will impart higher MD flexural modulus (when they impart machine direction orientation) or TD flexural modulus (when they impart transverse direction orientation).

When comparing sample CS36 with samples 37, one can see that when adding N.A.3, there is a higher increase in the MD flexural modulus than in the TD flexural modulus, which indicates that N.A.3 impacts MD crystal growth orientation. When comparing CS36 with sample 38, one can see that when adding N.A.1 it imparts a higher increase to the TD flexural modulus compared to the MD flexural modulus, which indicates that N.A.1 imparts TD orientation. When comparing CS36 with sample 39, one can see that when N.A.2 was added, a higher increase to the TD flexural modulus compared to the MD flexural modulus was obtained, which indicates that N.A.2 imparts TD orientation. The addition of 100 ppm of PEG1000 to the high density polyethylene composition with N.A.3 shows some positive effect on the MD flexural modulus and a negative effect on the TD flexural modulus, as shown when comparing samples 37 and 37A. This is an indication that the addition of PEG1000 further improves the machine direction orientation imparted by the nucleating agent. The addition of 100 ppm of PEG1000 to the composition with N.A.1 shows only a small improvement to the MD flexural modulus and no effect on the TD flexural modulus, as shown when comparing samples 38 and 38A. When adding 100 ppm of PEG1000 to the composition containing N.A.2, there is a negative effect on the MD flexural modulus and a positive effect on the TD flexural modulus, as shown on samples 39 and 39A. This is an indication that PEG1000 further improves the TD orientation imparted by N.A.2.

Example 10

The following example demonstrates the modification of a high density polyethylene composition and performance enhancements achieved, according to the method of the present invention. This example used a different type of acid scavenger and a different type of PEG.

Twenty polyethylene compositions were produced as described in Tables 28 and 29, below

TABLE 28

High density polyethylene formulations.

| Component | Loading |
|---|---|
| HDPE (Dow DMDA-8007) | Balance |
| Stabilizer 1 (IRGANOX ® 1010) | 500 ppm |
| Stabilizer 2 (IRGAFOS ® 168) | 1000 ppm |
| Acid Scavenger (DHT-4V) | 400 ppm |
| PEG3350 | See Table 29 |
| Nucleator | See Table 29 |

The high density polyethylene used in these examples is Dow DMDA-8007, which is an 8.3 MI2.16, 0.967 g/cm$^3$ polyethylene, available from The Dow Chemical Company.

IRGANOX® 1010 is a primary antioxidant available from BASF

IRGAFOS® 168 is a secondary antioxidant available from BASF

DHT-4V is a hydrotalcite used as acid scavenger available from Kisuma Chemicals.

PEG3350 is a Polyethylene glycol with average molecular weight of 3350 g/mol. Commercial example of this material is CARBOWAX SENTRY™ Polyethylene Glycol 3350 available from the Dow Chemical Company.

The nucleating agents used in these examples are NA-21, NA-11, available from Adeka.

Nucleating Agent 1 (N.A.1)—blend of calcium cyclohexane-1, 2-dicarboxylate and zinc stearate.

Nucleating Agent 4 (N.A.3)—blend containing sodium 4-[(4-chlorobenzoyl)amino] benzoate as the main component

TABLE 29

High density polyethylene formulations.

| Sample | PEG3350 (ppm) | N.A.1 (ppm) | N.A.4 (ppm) | NA-21 (ppm) | NA-11 (ppm) |
|---|---|---|---|---|---|
| CS40 | | | | | |
| 41 | | 1000 | | | |
| 41A | 100 | 1000 | | | |
| 41B | 250 | 1000 | | | |
| 41C | 500 | 1000 | | | |
| 41D | 1000 | 1000 | | | |
| 42 | | | 1000 | | |
| 42A | 100 | | 1000 | | |
| 42B | 250 | | 1000 | | |
| 42C | 500 | | 1000 | | |
| 42D | 1000 | | 1000 | | |
| 43 | | | | 1000 | |
| 43A | 100 | | | 1000 | |
| 43B | 250 | | | 1000 | |
| 43C | 500 | | | 1000 | |
| 43D | 1000 | | | 1000 | |
| 44 | | | | | 1000 |
| 44A | 100 | | | | 1000 |
| 44B | 250 | | | | 1000 |
| 44C | 500 | | | | 1000 |
| 44D | 1000 | | | | 1000 |

Once the resin was ground, each of the compositions listed in Tables 28 and 29 were high intensity mixed, single screw extruded, and pelletized according to the above described procedure. The resulting pellets were used to form plaques and bars. which were tested for bi-directional flexural modulus and thermal properties as described above.

TABLE 30

Mechanical and thermal properties of formulations.

| Sample | $T_c$ (° C.) | Increase in Tc (° C.) | Machine Direction 1% secant modulus (MPa) | Increase in MD 1% secant modulus (MPa) | Increase in MD 1% secant modulus (%) | Transverse Direction 1% secant modulus (MPa) | Increase in TD 1% secant modulus (MPa) | Increase in TD 1% secant modulus (%) |
|---|---|---|---|---|---|---|---|---|
| CS40 | 118.8 | | 1079 | | | 1096 | | |
| 41 | 121.8 | | 982 | | | 1477 | | |
| 41A | 121.8 | 0 | 976 | −6 | −0.1 | 1504 | 27 | 1.8 |

TABLE 30-continued

Mechanical and thermal properties of formulations.

| Sample | $T_c$ (° C.) | Increase in Tc (° C.) | Machine Direction 1% secant modulus (MPa) | Increase in MD 1% secant modulus (MPa) | Increase in MD 1% secant modulus (%) | Transverse Direction 1% secant modulus (MPa) | Increase in TD 1% secant modulus (MPa) | Increase in TD 1% secant modulus (%) |
|---|---|---|---|---|---|---|---|---|
| 41B | 122.0 | 0.2 | 978 | −4 | 0.4 | 1468 | −9 | 0.6 |
| 41C | 121.8 | 0 | 966 | −16 | −1.6 | 1482 | 5 | 0.3 |
| 41D | 122.0 | 0.2 | 989 | 7 | 0.1 | 1479 | 2 | 0.1 |
| 42 | 120.7 | | 1283 | | | 1084 | | |
| 42A | 120.5 | −0.2 | 1309 | 26 | 2.0 | 1018 | −66 | −6.1 |
| 42B | 120.5 | −0.2 | 1367 | 84 | 6.6 | 1014 | −70 | −6.5 |
| 42C | 120.7 | 0 | 1338 | 55 | 4.3 | 1039 | −45 | −4.2 |
| 42D | 120.5 | −0.2 | 1334 | 51 | 4.0 | 1028 | −56 | −5.2 |
| 43 | 120.0 | | 1040 | | | 1310 | | |
| 43A | 120.7 | 0.7 | 1063 | 23 | 2.2 | 1330 | 20 | 1.5 |
| 43B | 120.8 | 0.8 | 1051 | 11 | 1.1 | 1372 | 62 | 4.7 |
| 43C | 120.8 | 0.8 | 1069 | 29 | 2.8 | 1356 | 46 | 3.5 |
| 43D | 120.8 | 0.8 | 1036 | −4 | −0.4 | 1370 | 60 | 4.6 |
| 44 | 120.8 | | 988 | | | 1387 | | |
| 44A | 121.0 | 0.2 | 998 | 10 | 1.0 | 1483 | 96 | 6.9 |
| 44B | 121.0 | 0.2 | 984 | −4 | −0.4 | 1512 | 125 | 9.0 |
| 44C | 121.2 | 0.4 | 1015 | 27 | 2.7 | 1517 | 130 | 9.4 |
| 44D | 121.2 | 0.4 | 1018 | 30 | 3.0 | 1493 | 106 | 7.6 |

Table 30 shows the effect of PEG3350 at varying loadings, when added to different nucleating agents. As expected, when adding the different nucleating agents to the high density polyethylene composition, higher Tc and bi-directional flexural modulus was obtained as expected, and shown when comparing CS40 with samples 41, 42, 43, and 44. The samples containing N.A.1 did not seem to be affected by the presence of PEG3350, since the Tc and flexural modulus in the two directions did not change much, as can be seen comparing sample 41 with 41A, 41B, 41C, and 41 D. When adding PEG3350 to the samples containing N.A.3, comparing sample 42 with 42A, 42B, 42C and 42D, one can see that the bi-directional flexural modulus changes with the addition of PEG3350, obtaining higher MD flexural modulus and lower TD flexural modulus, which is an indication of stronger crystal growth orientation. In a similar way, the addition of PEG3350 changes the bi-directional flexural modulus of the samples containing NA-21 and NA-11, this time imparting higher TD flexural modulus, as can be seen when comparing sample 43 with 43A, 43B, 43C, 43D and comparing sample 44 with 44A, 44B, 44C and 44D. The results obtained for MD and TD flexural modulus indicate that the N.A.3 and the phosphate esters impart different types of orientation. In U.S. Pat. Nos. 9,580,575 and 9,193,845 it is shown that the type of orientation imparted by N.A.4 generates lower permeation (oxygen transmission rate and water vapor transmission rate). Adding PEG to N.A.3, further reductions in the permeation would be expected. On the other hand, with the phosphate esters, one would expect the permeation to increase, and combinations of phosphate esters with PEG should further increase the permeation. Depending on the end use application, either an increase or decrease in permeation may provide desirable benefits.

Example 11

The following example demonstrates the modification of a linear low density polyethylene composition and performance enhancements achieved, according to the method of the present invention.

Twenty polyethylene compositions were produced as described in Tables 31 and 32, below:

TABLE 31

Linear low density polyethylene formulations.

| Component | Loading |
|---|---|
| HDPE (DOWLEX ™ 2035) | Balance |
| Stabilizer 1 (IRGANOX ® 1010) | 500 ppm |
| Stabilizer 2 (IRGAFOS ® 168) | 1000 ppm |
| Acid Scavenger (DHT-4V) | 400 ppm |
| PEG3350 | See Table 32 |
| Nucleator | See Table 32 |

The linear low density polyethylene used in these examples is DOWLEX™ 2035, which is an 6 MI2.16, 0.921 g/cm3 polyethylene, available from The Dow Chemical Company.

TABLE 32

Linear low density polyethylene formulations.

| Sample | PEG3350 (ppm) | N.A.1 (ppm) | N.A.4 (ppm) | NA-21 (ppm) | NA-11 (ppm) |
|---|---|---|---|---|---|
| CS45 | | | | | |
| 46 | | 1000 | | | |
| 46A | 100 | 1000 | | | |
| 46B | 250 | 1000 | | | |
| 46C | 500 | 1000 | | | |
| 46D | 1000 | 1000 | | | |
| 47 | | | 1000 | | |
| 47A | 100 | | 1000 | | |
| 47B | 250 | | 1000 | | |
| 47C | 500 | | 1000 | | |
| 47D | 1000 | | 1000 | | |
| 48 | | | | 1000 | |
| 48A | 100 | | | 1000 | |
| 48B | 250 | | | 1000 | |
| 48C | 500 | | | 1000 | |
| 48D | 1000 | | | 1000 | |

TABLE 32-continued

Linear low density polyethylene formulations.

| Sample | PEG3350 (ppm) | N.A.1 (ppm) | N.A.4 (ppm) | NA-21 (ppm) | NA-11 (ppm) |
|---|---|---|---|---|---|
| 49  |      |  |  |  | 1000 |
| 49A | 100  |  |  |  | 1000 |
| 49B | 250  |  |  |  | 1000 |
| 49C | 500  |  |  |  | 1000 |
| 49D | 1000 |  |  |  | 1000 |

Once the resin was ground, each of the compositions listed in Tables 31 and 32 were high intensity mixed, single screw extruded, and pelletized according to the above described procedure. The resulting pellets were used to form plaques and bars. which were tested for bi-directional flexural modulus and thermal properties as described above.

TABLE 33

Mechanical and thermal properties of formulations.

| Sample | $T_c$ (° C.) | Increase in Tc (° C.) | Machine Direction 1% secant modulus (MPa) | Increase in MD 1% secant modulus (MPa) | Increase in MD 1% secant modulus (%) | Transverse Direction 1% secant modulus (MPa) | Increase in TD 1% secant modulus (MPa) | Increase in TD 1% secant modulus (%) |
|---|---|---|---|---|---|---|---|---|
| CS45 | 104.7 |      | 196 |     |      | 204 |     |      |
| 46   | 116.3 |      | 201 |     |      | 292 |     |      |
| 46A  | 116.3 | 0    | 206 | 5   | 2.5  | 290 | −2  | −0.7 |
| 46B  | 116.3 | 0    | 200 | −1  | −0.5 | 288 | −4  | −1.4 |
| 46C  | 116.3 | 0    | 200 | −1  | −0.5 | 282 | −10 | −3.4 |
| 46D  | 116.0 | 0.3  | 202 | 1   | 0.5  | 280 | −12 | −4.1 |
| 47   | 112.3 |      | 219 |     |      | 204 |     |      |
| 47A  | 112.3 | 0    | 223 | 4   | 1.8  | 196 | −8  | −4.1 |
| 47B  | 112.3 | 0    | 221 | 2   | 0.9  | 199 | −5  | −2.6 |
| 47C  | 112.5 | −0.2 | 217 | −2  | −0.9 | 204 | 0   | 0.0  |
| 47D  | 112.3 | 0    | 213 | −6  | −2.7 | 205 | 1   | 0.5  |
| 48   | 114.3 |      | 255 |     |      | 278 |     |      |
| 48A  | 114.7 | −0.4 | 240 | −15 | −5.9 | 293 | 15  | 5.4  |
| 48B  | 114.8 | −0.5 | 243 | −12 | −4.7 | 287 | 9   | 3.2  |
| 48C  | 114.8 | −0.5 | 236 | −19 | −7.5 | 296 | 18  | 6.5  |
| 48D  | 114.7 | −0.4 | 238 | −17 | −6.7 | 291 | 13  | 4.7  |
| 49   | 114.3 |      | 220 |     |      | 288 |     |      |
| 49A  | 114.3 | 0    | 232 | 12  | 5.5  | 293 | 5   | 1.7  |
| 49B  | 114.3 | 0    | 228 | 8   | 3.6  | 295 | 7   | 2.4  |
| 49C  | 114.2 | 0.1  | 227 | 7   | 3.2  | 287 | −1  | −0.3 |
| 49D  | 114.3 | 0    | 218 | −2  | −0.9 | 283 | −5  | −1.7 |

Table 33 shows the effect of PEG3350 at varying loadings, when added to different nucleating agents in the linear low density polyethylene. When adding the different nucleating agents, higher Tc and bi-directional flexural modulus was obtained as expected, and shown when comparing CS45 with samples 46, 47, 48, AND 49. The samples containing N.A.1 and N.A.3 did not seem to be affected by the presence of PEG3350, since the Tc and flexural modulus in the two directions did not change much. When adding PEG3350 to the samples containing NA-21 and NA-11, a more significant effect is obtained, imparting higher TD flexural modulus in combination with NA-21, as can be seen when comparing sample 48 with 48A, 48B, 48C, 48D and imparting higher MD flexural modulus in combination with NA-11, as can be seen comparing sample 49 with 49A, 49B, 49C and 49D. The results obtained for MD and TD flexural modulus indicate that the N.A.4 and the phosphate esters impart different types of orientation. In U.S. Pat. Nos. 9,580,575 and 9,193,845 it is shown that the type of orientation imparted by N.A.3 generates lower permeation (oxygen transmission rate and water vapor transmission rate).

Adding PEG to N.A.3 one would expect further reductions in the permeation. On the other hand, with the phosphate esters, one would expect the permeation to increase, and combinations of phosphate esters with PEG should further increase the permeation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An extrusion composition consisting of:
   (a) at least one resin selected from the group consisting of polypropylene homopolymers, polypropylene random copolymers, and polypropylene impact copolymers;
   (b) at least one benzoic acid salt-based nucleating agent provided in the composition at a use level of between about 0.01 and 0.15 parts by weight, in relation to 100 parts by weight of the resin; and
   (c) at least one co-additive selected from the group consisting of poly(ethylene glycol), and copolymers containing segments of ethylene oxide, wherein the co-additive has a number average molecular weight of about 300 or more, and wherein the use level of the co-additive is about 0.005 parts by weight or more, in relation to 100 parts by weight of the resin.

2. The extrusion composition of claim 1, wherein the benzoic acid salt-based nucleating agent is selected from the group consisting of sodium benzoate, lithium benzoate, and blends thereof.

3. The extrusion composition of claim 1, wherein the co-additive is a poly(ethylene glycol) having a number average molecular weight between 300 and about 10,000.

4. The extrusion composition of claim 1, wherein the co-additive is a copolymer containing segments of ethylene oxide.

5. An article of manufacture made from the extrusion composition of claim 1.

* * * * *